(12) United States Patent
Somani et al.

(10) Patent No.: US 10,074,225 B2
(45) Date of Patent: Sep. 11, 2018

(54) VALIDATION IN SECURE SHORT-DISTANCE-BASED COMMUNICATION AND ENFORCEMENT SYSTEM ACCORDING TO VISUAL OBJECT FLOW

(71) Applicant: ACCENTURE GLOBAL SOLUTIONS LIMITED, Dublin (IE)

(72) Inventors: Avishek Somani, Toronto (CA); Scott T. Butler, Oakville (CA); Sunil Raina, Issaquah, WA (US)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 16 days.

(21) Appl. No.: 15/131,878

(22) Filed: Apr. 18, 2016

(65) Prior Publication Data
US 2017/0301160 A1 Oct. 19, 2017

(51) Int. Cl.
| | | |
|---|---|---|
| H04W 4/80 | (2018.01) | |
| H04W 4/00 | (2018.01) | |
| G07C 9/00 | (2006.01) | |
| H04W 48/16 | (2009.01) | |
| G06F 3/0484 | (2013.01) | |
| G06Q 20/32 | (2012.01) | |
| G07B 15/00 | (2011.01) | |
| H04N 7/18 | (2006.01) | |

(52) U.S. Cl.
CPC ....... *G07C 9/00079* (2013.01); *G06F 3/0484* (2013.01); *G06Q 20/327* (2013.01); *G07B 15/00* (2013.01); *H04N 7/183* (2013.01); *H04W 4/008* (2013.01); *H04W 4/80* (2018.02); *H04W 48/16* (2013.01)

(58) Field of Classification Search
CPC ....... H04W 4/008; H04W 4/02; H04W 8/005; H04W 76/02; H04W 48/16; G07B 15/00; G07C 9/00079
See application file for complete search history.

(56) References Cited

U.S. PATENT DOCUMENTS

| | | | |
|---|---|---|---|
| 5,485,347 A | 1/1996 | Miura | |
| 6,885,877 B1 * | 4/2005 | Ozaki | G06Q 20/06 455/346 |
| 7,255,264 B2 | 8/2007 | De Leon | |

(Continued)

FOREIGN PATENT DOCUMENTS

| | | |
|---|---|---|
| CN | 103686613 | 3/2014 |
| CN | 103826205 | 5/2014 |

(Continued)

OTHER PUBLICATIONS

Radius Networks, "How to Pop a Pass Using iBeacon Technology", http://developer.radiusnetworks.com/blog/ Downloaded on Nov. 28, 2015, 19 pages.

(Continued)

*Primary Examiner* — Behrooz Senfi
(74) *Attorney, Agent, or Firm* — Mannava & Kang, P.C.

(57) ABSTRACT

A secure short-distance-based communication and enforcement system validates users in a validation and enforcement area and can check if users in the validation and enforcement area have been validated. A flow of visual objects may be programmed into an enforcement computer, and used for the validations.

31 Claims, 20 Drawing Sheets

(56) References Cited

U.S. PATENT DOCUMENTS

| | | | |
|---|---|---|---|
| 7,567,920 | B2 | 7/2009 | Hammad et al. |
| 7,731,086 | B2 | 6/2010 | Sauders et al. |
| 8,326,221 | B2 | 12/2012 | Dorsey |
| 8,369,842 | B2 | 2/2013 | Proctor, Jr. |
| 8,781,502 | B1 | 7/2014 | Middleton et al. |
| 8,856,916 | B1 | 10/2014 | Sobel |
| 9,204,257 | B1 | 12/2015 | Mendelson |
| 9,792,604 | B2 * | 10/2017 | Gray .................. G06Q 20/3274 |
| 2001/0045886 | A1 | 11/2001 | Minowa |
| 2005/0070257 | A1 | 3/2005 | Saarinen et al. |
| 2005/0093697 | A1 | 5/2005 | Nichani |
| 2005/0233789 | A1 | 10/2005 | Maekawa |
| 2006/0214815 | A1 | 9/2006 | Komatsu |
| 2006/0242908 | A1 | 9/2006 | McKinney |
| 2007/0276765 | A1 | 5/2007 | Hazel |
| 2010/0066503 | A1 | 3/2010 | Rhie et al. |
| 2011/0137773 | A1 | 6/2011 | Davis, III |
| 2011/0153495 | A1 | 6/2011 | Dixon et al. |
| 2012/0005041 | A1 | 1/2012 | Mehta et al. |
| 2012/0235812 | A1 | 9/2012 | Maia et al. |
| 2012/0254040 | A1 | 10/2012 | Dixon et al. |
| 2012/0296828 | A1 * | 11/2012 | Bergdale ............ G06Q 20/0457 705/65 |
| 2013/0090134 | A1 | 4/2013 | Heshmati |
| 2013/0111044 | A1 | 5/2013 | Cherian et al. |
| 2013/0165157 | A1 | 6/2013 | Mapes |
| 2013/0201286 | A1 | 8/2013 | Schockmel |
| 2013/0322674 | A1 | 12/2013 | Ren |
| 2013/0332007 | A1 | 12/2013 | Louboutin |
| 2014/0095227 | A1 * | 4/2014 | Parker .................... G06Q 30/04 705/5 |
| 2014/0273857 | A1 | 9/2014 | White et al. |
| 2014/0279276 | A1 | 9/2014 | Tolcher |
| 2014/0344036 | A1 | 11/2014 | Serad |
| 2015/0042451 | A1 | 2/2015 | Matsumoto |
| 2015/0120558 | A1 * | 4/2015 | Andrews ............ G07C 9/00571 705/44 |
| 2015/0289207 | A1 | 10/2015 | Kubo |
| 2015/0289295 | A1 | 10/2015 | Granbery |
| 2015/0348146 | A1 | 12/2015 | Shanmugam et al. |
| 2016/0007184 | A1 | 1/2016 | Kulikov |
| 2016/0019726 | A1 | 1/2016 | Joy et al. |
| 2016/0044460 | A1 | 2/2016 | Cornaby |
| 2016/0055693 | A1 * | 2/2016 | Somani ................. G07B 15/02 340/5.61 |
| 2016/0073264 | A1 | 3/2016 | Van den Broeck |
| 2016/0087959 | A1 | 3/2016 | Park |

FOREIGN PATENT DOCUMENTS

| | | |
|---|---|---|
| CN | 130999523 | 8/2014 |
| CN | 104392501 | 3/2015 |
| CN | 105243689 | 1/2016 |
| WO | 2015100185 | 7/2015 |
| WO | 2015123378 | 8/2015 |

OTHER PUBLICATIONS

Masabi, "Transport Operators and Barcode M-Ticketing", London, UK, download date Oct. 28, 2015. http://www.masabi.com/wp-content/uploads/2011/02/Transport-Operators-and-Barcode-mTicketing.pdf.

HopOn, "HopOn Beacon", download date Oct. 28, 2015, 9 pages. http://hopon.co/technology/.

Two Canoes, "Bleu Meetings", download date Oct. 28, 2015, 5 pages. http://twocanoes.com/products/online-services/bleu-meetings.

MTA, "LIRR Seeking Development of Train Ticketing App", Jan. 26, 2013, 2 pages. http://www.mta.info/news/2013/01/26/lirr-seeking-development-train-ticketing-app.

Intercom, "How Mobile Ticket delivery works?", download date Oct. 29, 2015, 3 pages. http://www.intercom.ee/mobile-ticketing-works.

Radius Networks, "How to Pop a Pass Using iBeacon Technology", Oct. 6, 2015, 19 pages. http://developer.radiusnetworks.com/blog/.

Two Canoes, "Bleu Meetings", download date Oct. 28, 2015, 5 pages. http://towcanoes.com/products/online-services/bleu-meetings.

* cited by examiner

VALIDATION IN SECURE SHORT-DISTANCE-BASED COMMUNICATION AND ENFORCEMENT SYSTEM ACCORDING TO VISUAL OBJECT FLOW

BACKGROUND

For a variety of situations and reasons, it may be desirable to control. monitor and validate people's access to an area of interest. For example, it is not uncommon to include a gate to block entrance to a parking lot or secured facility. In another example, mass transit systems, such as subways, often include some form of entrance control to enforce fare payment to ride the subway. Also, other places, like concert halls, stadiums, etc., still have conventional paper tickets, and people are employed to physically validate each individual ticket.

Controlling access to these areas can be automated. For example, a user has a card key, and a reader is installed at a locked entrance. To gain access to the area, the user inserts his card key into the reader or places it in very close proximity to the reader so the reader can read the card key. The information transmitted from the card key may be an ID and/or other information for the user and is processed through appropriate business rules to determine if the user is authorized to access the area. If the user is determined to be authorized, the door is unlocked and the user is allowed to enter.

In other examples, instead of being automated, a person is responsible for monitoring or controlling an area. For example, a security guard is responsible for checking people entering an area. In another example, passengers purchase tickets to ride on a train and after the passengers are on the train, a train conductor checks each person to determine if they have a ticket.

In the situations described above, either a user is required to have to carry an additional card key and physically present the card key to the reader to gain access to the restricted area, which can be a major inconvenience, or personnel, such as a security guard or a train conductor, are needed to control or monitor an area, which is not always cost effective and is susceptible to human error. Furthermore, the security of conventional systems is not optimal. In conventional systems, security codes used to validate the card keys are often stored on readers, and encoded into the card keys. They are highly susceptible to hacking and as a result create a vulnerability of providing unauthorized access to restricted areas.

BRIEF DESCRIPTION OF DRAWINGS

Features of the present disclosure are illustrated by way of examples shown in the following figures. In the following figures, like numerals indicate like elements, in which.

DETAILED DESCRIPTION

Figure 1:
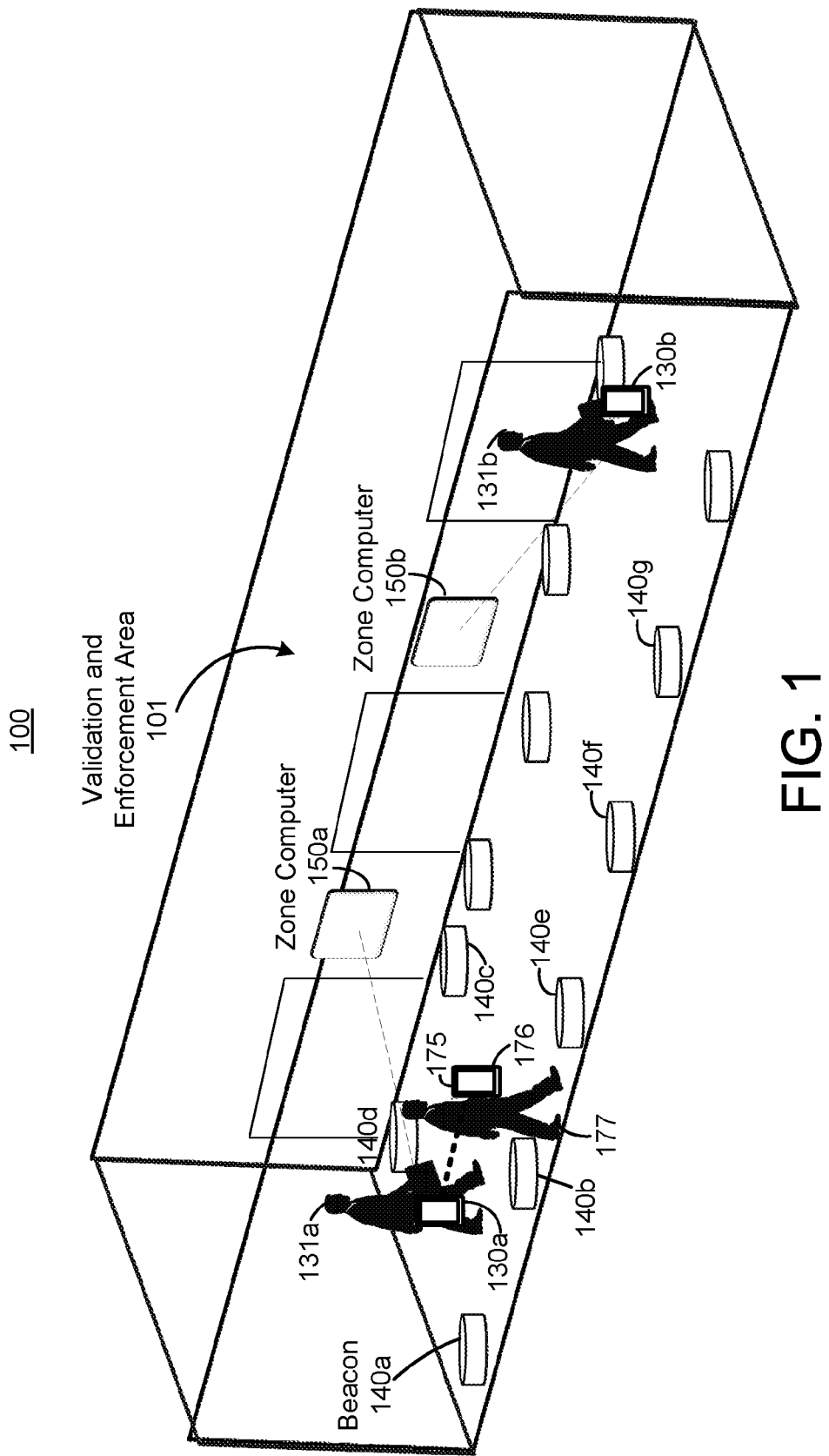
FIG. 1 illustrates a secure short-distance-based communication and enforcement system, according to examples of the present disclosure.

For simplicity and illustrative purposes, the present disclosure is described by referring mainly to examples thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

A secure short-distance-based communication and enforcement system employs low-powered beacons, zone computers and enforcement computers in a validation and enforcement area. Individuals communicate through their mobile devices with the beacons and zone and enforcement computers to validate that the individuals are authorized to be in the validation and enforcement area and to provide on-the-spot verification that individuals are authorized to be in the validation and enforcement area. The system facilitates secure communication through short-distance-based communication between the mobile devices and the zone and enforcement computers and through on-the-spot unique mobile device identifier (ID) and key generation. The unique mobile device ID and the key that enable the secure communication are generated for a specific mobile device at its current location proximal to a zone computer. The unique mobile device ID may be determined from signals received from beacons for the current location of the mobile device. For example, the unique mobile device ID is unique to the mobile device and a current location of the mobile device when it transmits the mobile device ID to the zone and/or enforcement computer associated with the zone where the mobile device is located.

By employing the short-distance-based, secure communication for message exchange, the mobile device may remain in the user's pocket or bag and engage in activation and validation processes with the zone computer and other external computers to validate an individual. Additionally, the system may include multiple zones but the system employs techniques to minimize cross-talk between mobile devices and zone computers to facilitate secure message exchange and validation of multiple users simultaneously. The secure communication and cross talk minimization of the secure short-distance-based communication and enforcement system represent significant technical advantages over existing systems. Also, an application running on the mobile device that facilitates security and other functions can easily be remotely updated over a network. However, card keys do not support this feature.

The system may be used in transit scenarios involving buses, trains, taxis, or other vehicles. For validation, the system may be provided for example at the entrance and/or exit of the validation and enforcement area, such as the entrance to a train station. The entrance may be gated, and validation is performed to open the gate or deny access to the area by closing the gate. For example, an individual can use their Bluetooth-enabled mobile device to pay their fare at turnstiles, fare gates, etc. They can have their fare deducted with the aid of their mobile device while the mobile device remains inside their pockets or bag, or the fare can also be deducted by lightly tapping their mobile device on a zone computer. Also, the system may be used in non-gated stations, or other non-gated environments where the individual does not pass through a gate or some other type of movable physical barrier to enter the validation and enforcement area. For example, the validation and enforcement area may be inside the vehicle or on a train station platform. The system determines whether the individual is in the area and settled inside the area, such as settled inside the bus or settled on the train station platform, before conducting validation, which may include fare payment. Similarly to the gated environment, the fare can be deducted from the mobile device while the mobile device remains inside a pockets or bag, or the fare can also be deducted by lightly tapping the mobile device on a zone computer, but the fare payment is done inside the bus or train or other vehicle rather than at a fare gate.

Also, regardless of whether validation is performed for example at a gated entrance or inside the vehicle, an enforcement computer inside the validation and enforcement area, which may be inside the vehicle, performs on-the-spot verification to determine whether the individual is validated. The enforcement computer may be a mobile device that may be carried by an inspector or some other individual to verify that the passengers are validated and have paid their fares. When an inspector demands a proof of payment, the individual lightly taps their mobile device on the inspector's enforcement computer. Both the devices interact over Bluetooth or some other short-distance wireless communication interface and the inspection result is displayed for the inspector on the enforcement computer. The enforcement computer can be a mobile device carried by the inspector or a stationary computer that is mounted on a physical structure inside the validation and enforcement area. The enforcement device or the user's mobile device may be a wearable device, such as GOOGLE glass, a smart watch, etc., and may be a combination of a mobile device and a separate Bluetooth sensor that is connected to the mobile device whereby communication is enabled via the Bluetooth sensor. The validation and enforcement area may be a fare paid zone where an individual is required to pay a fare to be in the area. A proof of payment can be demanded inside the validation and enforcement area. By way of example, the validation and enforcement area can be inside a bus, train, subway, subway platform, train station, street car platform, etc. Tickets for the fare can vary based on passenger profile (e.g., adult, child, student, senior, etc.), transit type (e.g., bus, subway, train, etc.), reusability (e.g., one time ticket, one day pass, weekly pass, etc.), time of travel (e.g., weekday, weekend, peak hours, off-peak hour, etc.).

FIG. 1 illustrates a secure short-distance-based communication and enforcement system 100, referred to as the system 100. The system 100 is employed at validation and enforcement area 101. The validation and enforcement area 101 may be a geographic area or location and/or a physical structure that individuals can enter and exit. The physical structure may be a mobile structure, such as a vehicle (e.g., bus, train, car, airplane, etc.), or a stationary structure such as a building or some other type of stationary structure. Also, the validation and enforcement area 101 may or may not have physical structures to control entry or exit into validation and enforcement area 101. For example, a validation and enforcement area 101 may be an open area.

The system 100 may be used for a non-gated environment, such as inside a vehicle, train station platform, etc., or for a gated environment, such as a subway entrance through a gate, or for any area where individuals may enter or exit and validation and enforcement of validation can be performed if the individual is detected in the validation and enforcement area 101. The system 100 may be used to execute fare payment for validation or to confirm that the ticket has been purchased and the fare has been paid for enforcement. Furthermore, the validation and enforcement area 101 may be divided into a plurality of sub-locations, also referred to as zones. Validation and enforcement may occur in any of the zones in the validation and enforcement area 101. Multiple individuals can be simultaneously validated by the system 100 in a validation mode, and multiple individuals can be simultaneously checked for validation in an inspection mode for enforcement by the system 100.

Individuals in the validation and enforcement area 101 are checked, for example, to determine whether they are approved to be in the validation and enforcement area 101 and/or to grant or deny approval of them being in the validation area. For example, individuals in the validation and enforcement area 101 are supposed to be validated. For validation, the individuals may have engaged in the validation process to be allowed entry into the validation and enforcement area 101 or may have engaged in the validation process after they entered the validation and enforcement area 101. Through an inspection process, the system 100 can determine whether an individual in the validation and enforcement area 101 has gone through validation and is approved to be in the validation and enforcement area 101. Accordingly, enforcement of validation may include determining whether individuals in the validation and enforcement area 101 are approved to be in the validation and enforcement area 101.

Validation may be based on validation rules stored in the zone computers or a backend server or the mobile devices. In one example, validation may include paying a fare associated with the validation and enforcement area 101, such as paying a fare for riding a bus, train or taxi. The validation rules may include rules to determine the amount of fare, such as whether the fare is based on distance or number of stops or whether a single fare is charged for any distance traveled, or based on other fare payment rules. Enforcement may include executing an inspection process to determine whether an individual has been approved to be in the validation and enforcement area 101. In one example, the enforcement includes determining whether an individual paid the fare. "Users" and "individuals" are generally used interchangeably in the present disclosure and refer to anyone or anything that is to be validated and/or inspected in the validation and enforcement area 101.

The system 100 may include end user mobile devices 130 that can each run a validation and enforcement application, shown as validation and enforcement applications 132 for the mobile devices 130, to receive information from beacons 140 and exchange information with zone computers 150 to facilitate validation in the validation and enforcement area 101. Mobile devices 130a and 130b are shown for users 131a and 131b respectively but of course, any number of individuals using mobile devices may be validated by the system 100. Also, multiple beacons 140, including beacons labeled 140a-d, and multiple zone computers 150, including zone computers labeled 150a-b, are shown, however, any number of beacons and zone computers may be included in the system 100 depending on various factors, such as how many users need to be processed simultaneously in the validation and enforcement area 101.

The beacons 140 are hardware that can broadcast beacon signals. The beacons 140 may be standalone devices or incorporated into another system. A zone computer and/or an enforcement computer may have a beacon. The beacons 140 broadcast beacon signals at a short distance, such as up to 10 meters or a much shorter distance, such as up to 4 centimeters. For example, the beacons 140 may be Bluetooth, Bluetooth Low Energy (BLE), or near-field communication (NFC) beacons. The beacons 140 may be part of a local positioning system, such as IBEACONS, that are used to wirelessly determine the position of the mobile devices 130 inside the restricted area 101. The beacons 140 may be positioned at strategic locations inside the validation and enforcement area 101 to facilitate accurate detection of a user within the validation and enforcement area 101. The broadcast range and power of the beacons can be tuned per the environment. For example, the broadcast range of the beacons is tuned to cover the boundaries of their respective zones. For example, the beacons 140 can broadcast towards the inside of their respective zone and may have a range to cover their zone but not much farther to prevent accidentally validating a mobile device that may be adjacent the validation and enforcement area 101 but not in it. Also, the validation and enforcement applications 132 running on the mobile devices 130 can filter out the beacons below a specific power range or accuracy or angle or azimuth or distance. Also, each of the zone computers 150 may be associated with a different zone in the validation and enforcement area 101, and a mobile device in a zone can identify the zone computer for the current zone based on location information determined from signals received from the beacons in the zone. The beacons 140 broadcast a signal that invokes a validation process between the mobile devices 130 and the zone computers 150. For example, after receiving signals from the beacons 140a-d, the mobile device 130a communicates with the zone computer 150a to validate the user 131a, and similarly, the mobile device 130b communicates with the zone computer 150b to validate the user 131a.

In one example, the beacons 140 and the zone computers 150 may be provided at the entrance and/or exit of the validation and enforcement area 101. For example, the beacons 140 and the zone computers 150 may be provided at a gated entrance to control access to the validation and enforcement area 101. If a user is validated at the gate, the gate is opened to allow the user to enter. Validation at the gated environment is further described with respect to FIG. 3.

As shown in FIG. 1, the system 100 also includes an enforcement computer 175. Although a single enforcement computer 175 is shown, there may be multiple enforcement computers in the validation and enforcement area 101. The enforcement computer 175 may be a mobile device carried by a person, shown as the enforcement person 177, checking the validation of the users 130. For example, the enforcement computer 175 is in close proximity to the mobile device 130a as shown in FIG. 1 and communicates with the mobile device 130a to check the validation of the user 131a. Although the enforcement computer 175 is shown as a mobile device, the enforcement computer 175 may be a stationary computer mounted on a physical structure, such as on a wall or another structure that generally does not move within the validation and enforcement area 101. The enforcement computer 175 for example runs an inspection application 172 to check the validation of the users 130.

The enforcement computer 175 may include an inspection beacon 176 that broadcasts an inspection signal through a short-distance communication interface in the enforcement computer 175. If the mobile devices 130 receive the inspection signal, the validation and enforcement applications 132 for the mobile devices 130 are placed in inspection mode to disable validation, such as disabling buying fare products, and disabling fare payment, through the validation and enforcement applications 132 and to facilitate checking the validation of the users 132. By disabling fare payment or other validation actions that can be performed by the user, it prevents the user from being able to only pay the fare when they are being inspected or when they see an enforcement officer inspecting passengers or are informed by other means of an enforcement officer inspecting passengers. Instead, the user has to pay the fare prior to entering inspection mode on the mobile device and thus encourages users to pay the fare righteously when entering the validation and enforcement area 101. Upon checking validation, if the user is indicated as not being validated, the user may be removed from the validation and enforcement area 101, or charged an additional penalty fee in addition to the fare, or some other action may be performed in response to determining the user has failed to validate.

In one example, instead of, or in addition to the enforcement computer 175 including the inspection beacon 176, the enforcement computer 175 can place the beacons 140, which may have previously been used for validation, into inspection mode. In the inspection mode, the beacons 140 broadcast the inspection signal to facilitate the checking of the validation of the users 130. Assuming the beacons 140 can operate in different modes, when the beacons are not in inspection mode, the beacons 140 operate in validation mode and broadcast a validation signal to facilitate validation. The inspection signal and the validation signal may include a beacon ID. The beacon ID may identify the signal as an inspection signal or a validation signal. The signal may carry additional information that can identify it as an inspection signal or a validation signal. For example, a unique ID in a beacon signal can identify the beacon signal as an inspection signal or a validation signal.

If the enforcement computer 175 is a stationary computer, it can inspect all the passengers that are in the validation and enforcement area 101, and may identify a particular seat or other location where the passenger is located based on triangulation and beacon information. Either the mobile device or the enforcement computer may determine the location. The stationary enforcement computer 175 can update a backend server on enforcement status, and the enforcement officer can come on an as-need basis.

The mobile devices 130 and the enforcement computer 175 (assuming it is a mobile device) may be any computer that a user may carry and that can run an application. Examples of the computers may include mobile phones, tablets, wearable computers, such as GOOGLE glass or smart devices embedded into clothing, a smart watch, fitness tracker, or wireless enabled shoes, or some other type of mobile computer. The mobile devices 130 and the enforcement computer 175 may include short-distance wireless communication interfaces that can wirelessly communicate with beacons 140 and zone computers 150 and the enforcement computer 175 when in proximity to the beacons 140 and the zone computers 150 and the enforcement computer 175. Also, in addition to receiving signals from the beacons 140, the mobile devices 130 and the enforcement computer 175 themselves may operate as a beacon and broadcast a beacon signal or act as a peripheral, enabling services and/or characteristics, or act as a central computer and start searching for peripherals with certain services and/or characteristics and/or name and/or other unique identifiers. The mobile devices 130 and the enforcement computer 175 may include a beacon. In one example, a short-distance communication interface in a mobile device or the enforcement computer 175 can broadcast a beacon signal to initiate communication.

In one example, the short-distance wireless communication interfaces may include NFC interfaces. NFC is a set of standards for smartphones and other mobile devices to establish radio communication with each other and other computers by touching them together or bringing them into close proximity. The close proximity may be a few inches or few centimeters (e.g., 4 centimeters). Other wireless interfaces may be used. For example, Bluetooth may be used and has a longer range, but may consume more battery power and is more susceptible to cross talk. In another example, BLE or Bluetooth 4.0 or future versions of Bluetooth wireless interfaces may be used. BLE is a wireless technology that is intended to provide reduced power consumption when compared to Bluetooth but has a similar range to Bluetooth. The components of the system 100 may have one or multiple types of short-distance wireless interfaces, which may have ranges from a few centimeters to a few meters. In another example, the range is up to 100 feet. The zone computers 150, mobile devices 130 and the enforcement computer 175 may include other communication interfaces as well, which are wired or wireless and may be network interfaces for communicating packets over a local area network and/or a wide area network. However, communication between the beacons 140/inspection beacon 176 and the mobile devices 130 and communication between the zone computers 150 and the mobile devices 130 and communication between the enforcement computer 175 and the mobile devices 130 may rely on short-distance wireless interfaces for communication with each other. Communication via a network interface may be for exchanging messages with a backend server via a network, which may be done for validation and inspection.

The beacons 140 and beacon 176 may include small computers that may be attached to or embedded in a physical infrastructure. A mobile application may be used to implement one or more of the beacons 140 or 176. For example, a beacon mobile application may use an existing communication interface of a mobile device to send a beacon signal. The beacons 140 and beacon 176 may broadcast a message every x milliseconds (ms), where x>1 ms and may be less than 200 ms but other intervals may be used and may be based on the environment and use cases. The message may include a unique ID or a set of unique IDs or a combination of generic IDs and unique IDs. In one example, at least one part of the ID is generic and the other part is unique. In one example, the ID may include a universally unique identifier (UUID) a major ID and/or a minor ID. For example, one of the identifiers is generic (e.g., UUID and/or the major ID) and may be the same for all beacons that belong to or are for a particular entity, such as for the same company or the same mass transit system, or may vary between different entities or restriction level within the same company or mass transit system. The other unique ID (e.g., minor ID) may help identify a particular location or sub-location. For example, the major ID may be the same for all beacons that belong to a particular location within the system, such as a specific rail station or a bus stop or train, and the minor ID may be different for each subway car or can be unique to the beacon and can be associated with a particular sub-location within a location. Also, the major ID or the minor ID may identify the beacon as an inspection beacon or a beacon for validation.

The mobile devices 130 listen for the broadcasts from the beacons 140, which may contain the unique identifiers for each beacon, or inputs from which the unique identifiers may be calculated or computed or derived or looked up in an internal data store. When a mobile device is in range of one or more of the beacons 140, unique identifiers received from the beacons at the mobile device may invoke a detection mode in the mobile device to determine whether the mobile device is in proximity to at least one of the zone computers 150 or the enforcement computer 175 in the validation and enforcement area 101. This is referred to as detection or detection mode. In detection mode, to determine whether the mobile device is in proximity to a zone computer or the enforcement computer 175, the unique beacon identifiers, signal strength (such as received signal strength indicator (RSSI), transmission power, and/or received Power) of the beacon's broadcasts, broadcast zone, broadcast accuracy, azimuth and/or angle of the beacon signal (e.g., calculated from the received wireless broadcast) are used to identify the location of the mobile device. If the mobile device detects that it is in the validation and enforcement area 101, it may engage in communication with the zone computer or the enforcement computer 175 for validation or enforcement. This may involve the mobile device getting into a peripheral mode, wherein the mobile device may start sending message broadcasts over the wireless interface (e.g. Bluetooth 4.0), like a beacon. For example, the mobile device acts as a Bluetooth peripheral and advertises, broadcasts, transmits, and/or enables its services and/or characteristics using one or more of unique mobile IDs. The zone computer or the enforcement computer 175 may use the unique mobile device ID to identify the mobile device or the services/characteristics advertised, broadcasted, transmitted, and/or supported by the mobile device or the fare payment application on the mobile device. In another example, the zone computer or the enforcement computer 175 broadcasts a message indicating that it is available for validation or enforcement and the mobile device ID which is calculated by the computer is included in the message. The mobile device receives the message, determines whether the mobile device ID in the message matches the mobile device ID calculated by the mobile device, and if it does match, initiating a message exchange for authentication and validation.

The zone computers 150 include computers that may be provided in the validation and enforcement area 101 for authentication and validation of users in the validation and enforcement area 101. A zone computer may support an entire validation area or a zone in the validation area. The zone computers 150 engage in message exchange and validation processes with the mobile devices 130 for authentication and validation after the mobile devices enter peripheral mode, which may be invoked after the mobile devices 130 detect that they are in the validation and enforcement area 101 and that the mobile devices 130 are settled. For example, a process is executed to establish a secure communication channel between a mobile device and a zone computer through run-time key generation, which may be based on the ID of beacons and other information. Messages may be exchanged via the secure communication channel to perform validation. In one example, validation may include fare-based validation, such as when payment of a fare is required.

Similarly, the enforcement computer 175 engages in secure message exchange and processes with the mobile devices 130 for authentication and to check validation, which is further described below. Both the zone computers 150 and the enforcement computer 175 may be connected to a back-end server via the Internet or another wide area network to provide updates and perform other functions which may include validation-related functions.

Figure 2:
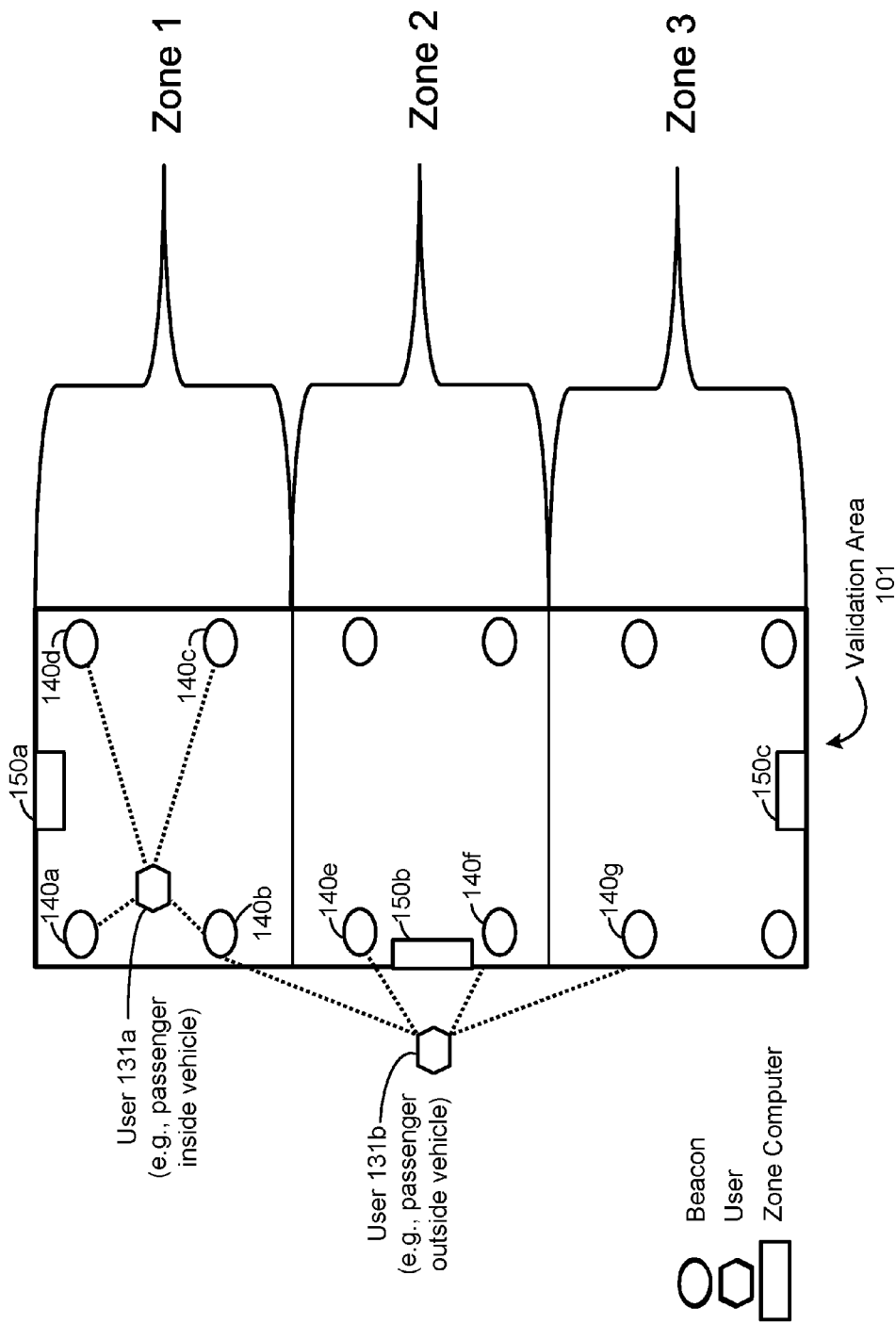
FIGS. 2 and 3 show examples of zones in a validation area.
Figure 3:
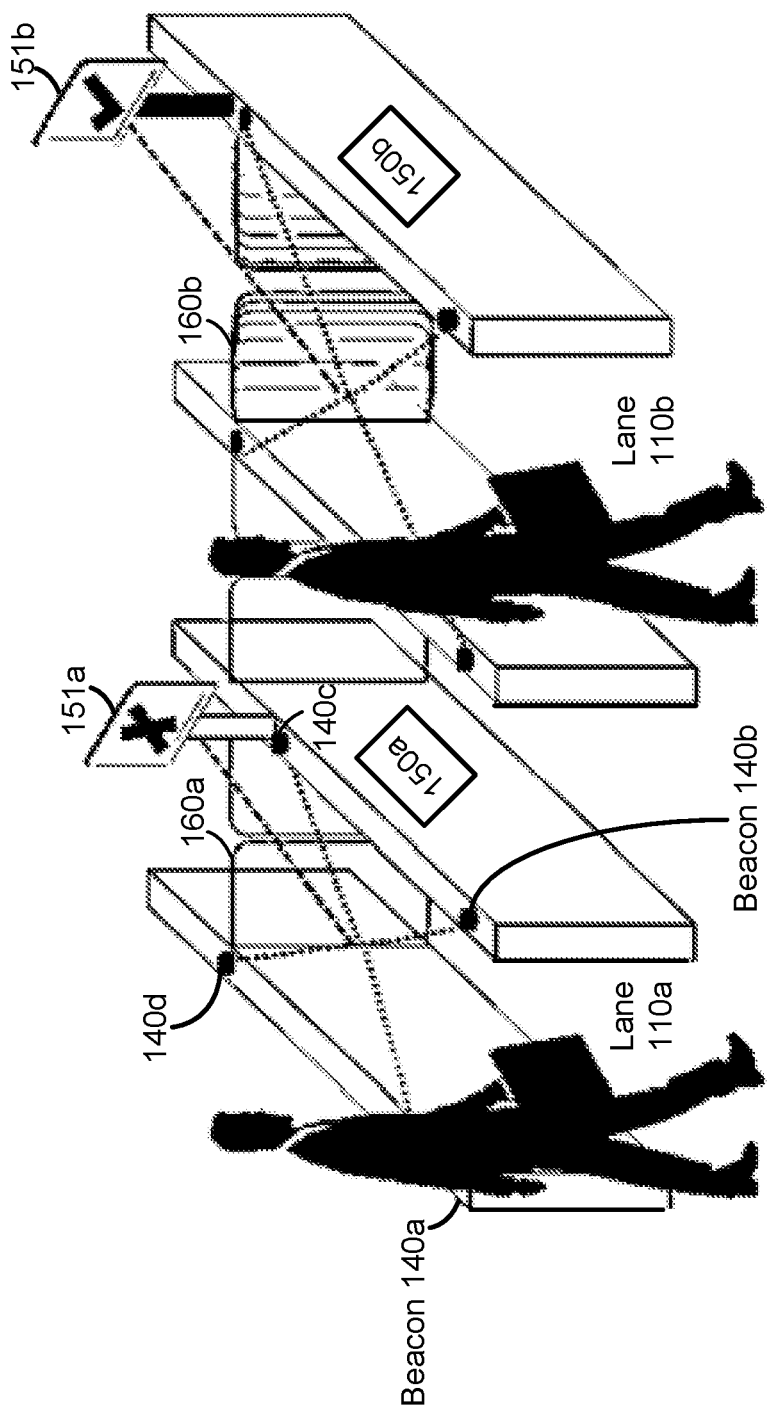

FIGS. 2 and 3 show examples of validation in the validation and enforcement area 101. FIG. 2 shows an example of validation performed in a non-gated environment, such as validation performed after the users 130 enter the validation and enforcement area 101. This may include charging a fare after the users 130 enter a bus or after the users 130 enter a subway car. FIG. 3 shows an example of validation performed in a gated environment, such as validation performed at an entrance of a subway station. Regardless of whether the validation and enforcement area 101 is a gated environment or a non-gated environment, when the users 130 are inside the validation and enforcement area 101, the enforcement computer 175 may be used to check the validation of the users 130 such as shown in FIG. 1 and further described below.

FIG. 2 shows an example of a configuration of beacon placement in multiple zones 1-3 in the validation and enforcement area 101. The validation and enforcement area 101 may be inside a vehicle, such as a subway car. The subway car may have multiple zones 1-3, which may be adjacent doors to get in and out of the subway car. In this example, user 131a is in zone 1, and user 131b is outside zone 2 and outside the subway car (i.e., outside validation and enforcement area 101). When the user 131a enters zone 1, the mobile device 130a for the user 131a receives the signals from beacons 140a-d. The validation and enforcement application 132a running on the mobile device 130a enters detection mode and detects that it is in a zone in the validation and enforcement area 101 and is in proximity to the zone computer 150a. For example, the validation and enforcement application 132a uses the beacon information from signals received from the beacons 140a-d to determine its location and calculate the passenger's position in zone 1. The beacon signals relative strength, angle, azimuth, etc. and the location information derived from the major ID or minor ID or carried in the payload of the signals are used to determine the precise location of the user 131a. The precise location may indicate that the mobile device 130a or the user 131a is in zone 1 and may further identify an area within zone 1, such as a seat.

At the current location of user 131b, the mobile device 130b of user 131b receives beacon signals from beacons 140b and 140e-g. The beacon signals relative strength, angle, azimuth, etc. and the location information derived from the major ID or minor ID or carried in the payload of the signals from beacons 140b and 140e-g are used to determine the precise location of the user 131b. Based on this information, the validation and enforcement application 132b may determine that the user 131b is outside the validation and enforcement area 101 and not enter peripheral mode. For example, the validation and enforcement application 132b may determine that the signals are from beacons assigned to different zone computers, such as zone computers 150a-c. Also, from the signal strength, angle, and azimuth, the validation and enforcement application 132b may determine that the signals from beacons 140b and 140g have a signal strength below a threshold, and an angle and azimuth that are indicative of beacons associated with different zones and different zone computers. Thus, the validation and enforcement application 132b may ascertain that the closest beacons are beacons 140e-f. The validation and enforcement application 132b may further determine that since it is not receiving signals, or receiving signals that are too weak, from at least three or all four beacons for the same zone, that it is outside the validation and enforcement area 101. Therefore, the validation and enforcement application 132b does not enter peripheral mode and does not engage in validation.

Also, the zone computers 150 may be connected to displays (not shown) to provide indication to the user of whether they are validated or not. For example, zone computer 150a may display a message indicating user 131a is validated. If multiple users are in the zone, a user ID may be displayed along with an indication of whether the user is validated. For example, a check mark indicates a person is validated. If the person is not validated, the display may show an X, and may provide additional information, such as "See Attendant" or "Insufficient Funds" if the user's account does not have sufficient funds to pay a fare. Also, external systems may be invoked, such as to alert attendants or to automatically replenish funds in a user's account or change user's access privileges.

FIG. 3 shows an example of validation that may be performed for a gated validation and enforcement area 101. The lanes 110 may be zones of an entry point. The beacons 140 and/or the zone computers 150 may be embedded in the physical structures of the lanes 110. The zone computers 150 may electronically control movable physical barriers 160, such as gates, turnstiles, etc. Each electronically-controlled movable physical barrier may be located in a different zone. For example, movable physical barriers 160a-b in lanes 110a-b allow or deny access to the validation and enforcement area 101. Also, the zone computers 150 may be connected to displays 151, such as displays 151a-b, to provide indication to the users 131 of whether they are approved to enter the validation and enforcement area 101 or not. Other information may also be displayed. For example, an arrow indicates a lane is open. The check mark shown on the display 151b indicates a user is validated and the gate opens. If the person is not validated, the display may show an X, such as shown on display 151a, and may provide additional information, such as "See Attendant" or "Insufficient Funds" if the user's account does not have sufficient funds to pay a fare. Also, external systems may be invoked, such as to alert attendants or to automatically replenish funds in a user's account.

Figure 4:
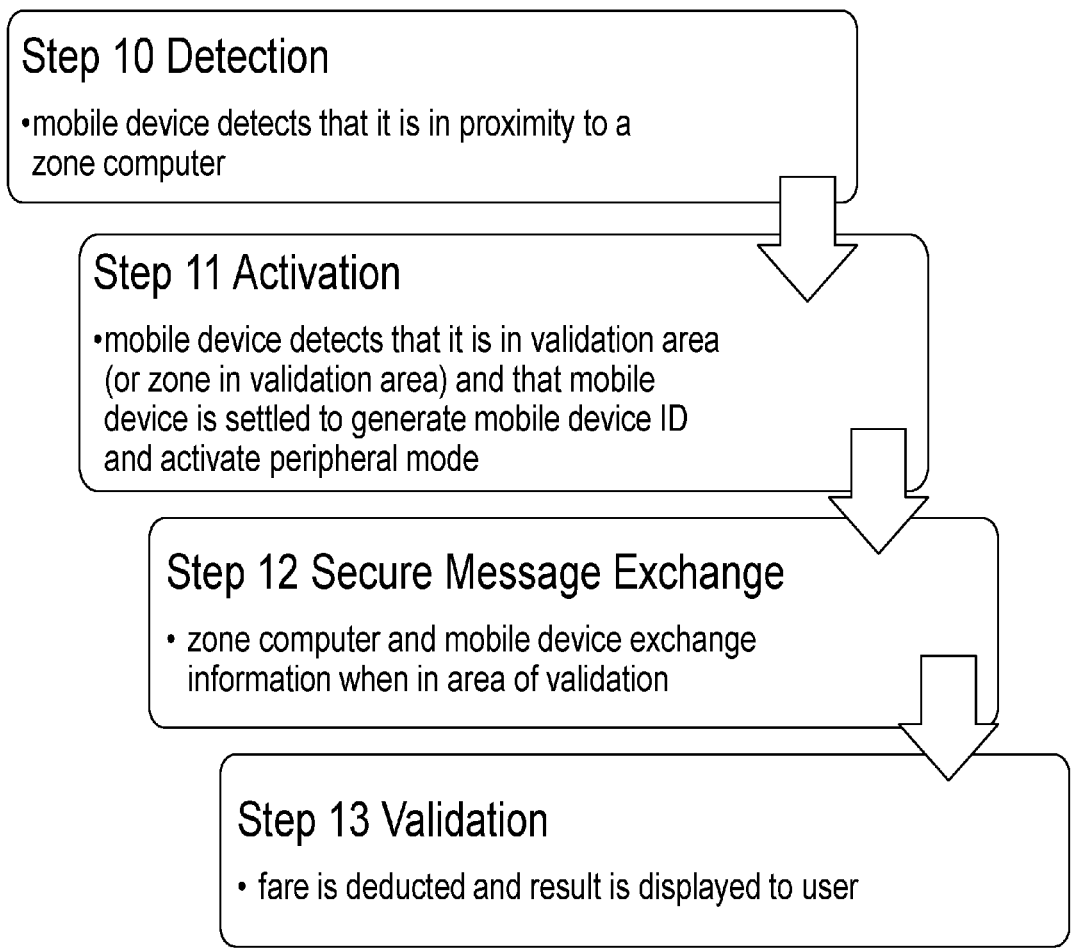
FIG. 4 shows a high-level flow chart of steps that may be performed for validation or enforcement by the a secure short-distance-based communication and enforcement system, according to examples of the present disclosure.
Figure 5:
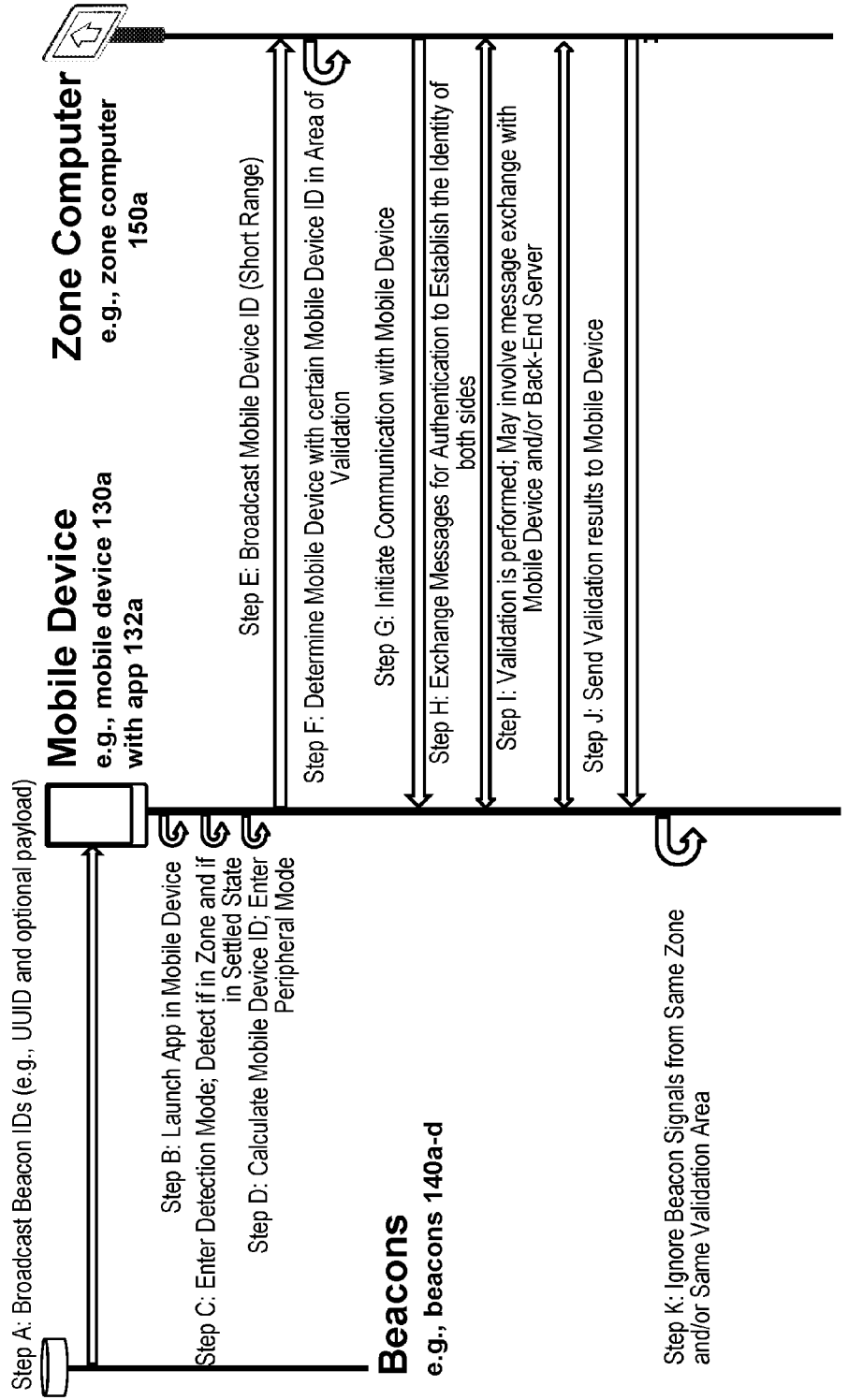
FIGS. 5-6 shows additional details of the steps of FIG. 4, according to examples of the present disclosure.

FIG. 4 shows a high-level flow chart of steps performed by the system 100, and FIG. 5 shows additional details of the steps and the interaction between the various sub-systems of the system 100, including the mobile devices 130, beacons 140, and zone computers 150 that perform the steps, according to an embodiment. Referring to FIG. 4, steps are shown for detection at step 10, activation at step 11, exchange at step 12 and validation at step 13.

At step 10, for detection, a mobile device determines whether it is in proximity to a zone computer (e.g., determining whether the mobile device is a validation area of a zone computer) based on information received from beacons. Determining proximity to a zone computer may include determining whether the mobile device is within a predetermined distance to a beacon or a plurality of beacons associated with a zone computer. Determining the distance to a beacon may be estimated based on signal strength, signal angle and azimuth, etc. According to an example, mobile device 130a shown in FIG. 1 receives signals from the beacons 140a-d. Each signal includes a beacon ID, e.g., a UUID, major ID and/or a minor ID. Each beacon ID may be determined so that it can be used to identify its location, such as station, zone, etc. The beacons 140a-d may also transmit a small payload containing the location information or any other information that can help to calculate the location information.

In one example, triangulation-based detection is performed to determine whether the mobile device 130a is in a zone. For example, the validation and enforcement application 132a running on the mobile device 130a registers for beacon notifications with a specific unique ID or IDs or part of the IDs, e.g. UUID and/or major ID and/or minor ID or a list of UUIDs, major IDs and/or minor IDs. For example, the UUIDs or the major IDs may be the same for all beacons provided by the same entity, such as all beacons for the same mass transit company or all beacons for the same train station. So, for example, the UUIDs broadcasted by the beacons 140 may be the same because they are for the same entity or same train station. The validation and enforcement application 132a stores a list of UUIDs, major IDs and minor IDs that it may respond to. The mobile device 130a listens for broadcasted unique IDs from beacons. If the unique IDs of the beacon signals that are received are registered, such as stored in the list, the validation and enforcement application 132a determines whether it is in a zone in the validation and enforcement area 101. For example, in response to recognizing broadcasts from beacons 140a-d or at least one of the beacons, using beacon signal attributes such as distance and azimuth, the validation and enforcement application 132a in mobile device 130a determines that it is within a predetermined distance (e.g., within 1 meter) to at least 1 of the beacons 140a-d. Thus, the validation and enforcement application 132a determines that it is in a zone, such as zone 1, and then proceeds to activation at step 111.

In another example, tap-based detection is performed. For example, the user lightly taps the mobile device 130a on or near beacon 140a or at zone computer 150a if it also acts as a beacon. The range of the beacon may be tuned so that the mobile device 130a needs to be in close proximity to detect the beacon, such as within 3-4 centimeters, or the mobile device might take into consideration the signal strength, zone, accuracy and other factors of the beacon broadcast to determine the proximity with the beacons, and decide accordingly. If a beacon unique ID or IDs are received that are registered at the mobile device 130a, in response to the tapping or placement in close proximity to the beacon, the application 132a performs activation at step 11. In another example, an intent of the user to enter validation is determined for example based on measurable user actions performed on the mobile device, such as shaking the mobile device twice, audible command spoken into the mobile device, etc.

At step 11 shown in FIG. 4, after detecting proximity to a zone computer at step 10, activation is performed. For example, activation may include determining whether the mobile device 130a of the user 131a is in a zone in the validation and enforcement area 101. FIG. 2 shows an example where the mobile device 130a is detected in zone 1. Activation may also include determining whether the mobile device 130a is in a settled state for a non-gated area, such as shown in FIG. 2. For the gated environment, such as shown in FIG. 3, a settled state need not be determined for activation. The settled state may be a mobile device that is determined to be stationary in the validation and enforcement area 101 for a predetermined period of time, and may be determined for the non-gated enforcement and validation area to prevent improper fare charging such as when a user quickly moves in and out of the enforcement and validation area 101 as is described below.

If the mobile device 130a is determined to be in a zone in the validation and enforcement area 101 and in the settled state for a non-gated area, a run-time unique mobile device ID and encryption keys are calculated for the mobile device 130a for future secure message exchange with the zone computer 150a, and a peripheral mode is activated. The peripheral mode is entered to communicate with the zone computer associated with the current location of the mobile device 132a, which is zone computer 150a for zone 1 in FIG. 2.

Determining whether the mobile device 130a is in a settled state may be performed to prevent accidentally entering into validation for fare payment. For example, the settled state indicates whether a mobile device is in a predetermined location for a predetermined amount of time. For example, if a user enters a bus with a validation and enforcement area and then exits the bus immediately without riding the bus, the mobile device of the user may receive a signal from a beacon in the bus. However, because the user does not settle in the bus, validation is not performed and the user is not charged.

The settled state may be determined from motion sensors and based on time. Measurements from different sensors inside the mobile device 130a (e.g., accelerometer, gyroscope, and/or motion co-processor) may be used to determine whether the mobile device 130a is stationary or is moving, and whether the mobile device 130a is moving in a direction outside the zone or outside the validation area and a rate of the movement. Also, the motion of the vehicle is determined in order to determine whether the mobile device is stationary or in motion while the vehicle is mobile or while the vehicle is stationary. If the mobile device 130a is moving while the vehicle is in motion, then the mobile device 130a may still be considered to be in a settled state but other factors may be considered. Also, the length of time the mobile device 130a is stationary may be ascertained from the sensor measurements to determine whether it is in a settled state. In one example, the validation and enforcement application 132a activates the peripheral mode if the mobile device 130a is determined to be in a settled state, or the vehicle is in motion for a predetermined period of time, and/or the mobile device 130a has been inside the vehicle for a certain amount of time.

Unique ID determination for the mobile device may vary depending on how detection was performed. For example, if triangulation-based detection was performed, the unique IDs (like major ID, minor ID and optional payload) from the beacons used for triangulation may be used to calculate the unique ID or IDs for the mobile device. If tap-based detection was performed, the unique ID or IDs may be calculated using the unique ID or IDs from the beacon that was tapped (e.g. major ID, minor ID and optional payload from the beacon that was tapped). The peripheral mode is enabled in the mobile device to communicate with the zone computer for the lane using the unique IDs for the services and/or characteristics. Examples of unique ID calculation functions are described below.

In one example, the unique ID or IDs for the mobile device are calculated using the information received from the beacons and/or zone computer as the input. Thus, the unique ID is specific to the current location of the mobile device. The unique ID is not valid (or may not be valid) at a different location The current location may be a particular zone in the validation area 101 or a specific seat in the zone.

A unique ID calculation function may be used to calculate the unique ID or IDs for the mobile device from the information received from one or more beacons. An example of a unique ID calculation function is described below. Assume the following: Row=Minor ID/1000; Sequence=Minor ID % 1000, whereby % represents the modulo operator; Location=Major ID/1000; and Sub-Location=Major ID % 1000.

If triangulation-based detection was used at step 10, the following steps may be performed to calculate the unique ID or IDs for the mobile device. The detected beacons are sorted based on the signal strength (like RSSI, transmission power, received power, etc.) in descending order. Beacons may be filtered, e.g., removed from the list, if their received signal strength indicator does not fall within a predetermined value, or if they proximity is unknown or if the azimuth and angle doesn't meet predetermined requirements or a combination of these. For example, if the signal strength is too weak, such as determined by comparing the signal strength to a predetermined threshold, the corresponding beacon may be removed from the list. Then, the top "x" beacons from the list are identified where x>1. In one example, x is greater than or equal to 3. If a plurality of beacons from the top "x" beacons have the required signal strength, then, the major ID and minor ID are used to calculate the Row, Sequence, Location and Sub-location information from the beacon signals, which is in turn is used to generate the unique ID or IDs. Beacons in the same lane may have the same location, sub location and row value.

If tap-based detection was used at step 10, then the following is performed with all the beacons that are found in range. At step 1, the beacons are sorted based on signal strength, accuracy, etc. in descending order and the first beacon in the list is identified or they are sorted in ascending order and the last beacon in the list is identified. Checks on the azimuth, angle, distance, accuracy are performed to ensure the mobile device is in the desired proximity of the beacon. At step 2, the signal strength value for this beacon should be greater than or equal to a predetermined value, e.g., <=−30 dB. At step 3, the row, location and sub-location information of the beacon is used to generate the unique ID or IDs.

One example of a unique ID calculation function for either tap-based detection or triangulation-based detection is: Unique ID=[Pre-defined Unique ID Part]+[Location]+[Sub location]+[Row]. In other examples, mathematical functions, such as a conventional hash function, RSA, etc., are employed that use these three values along with other values, to derive the unique ID or IDs. In other examples, mathematical functions can be used to determine these three values, which in turn become input to other mathematical functions to derive the unique ID or IDs. The input values may include current time, location, sub-location, row, sequence, etc.

At step 12 shown in FIG. 4, for message exchange, the mobile device and the zone computer for the zone exchange information for validation. Regardless of the way detection and activation were performed, message exchange occurs in the same way. The zone computer determines whether the mobile device is within its area of validation if the mobile device is within range. The area of validation may be a zone. For example, the area of validation for zone computer 150a is zone 1 shown in FIG. 2. To determine whether the mobile device is within the zone computer's area of validation, the zone computer may use the distance, signal strength, the azimuth and angle of the mobile device relative to the zone computer or a plurality of these values to determine the mobile device's location. The zone computer initiates a connection with the validation and enforcement application on the mobile device if the mobile device is in the area of validation and the mobile device is broadcasting or advertising or transmitting one or more unique IDs and/or has predetermined services and/or characteristics. Then message exchange may occur for validation. For example, the zone computer 150a and the validation and enforcement application 132a on the mobile device 130a may enter into authentication to establish the identity of both sides. After authentication, data is exchanged between the zone computer 150a and the validation and enforcement application 132a for validation. The zone computer 150a and the validation and enforcement application 132a may request additional data resulting in multiple exchanges. In another example, the mobile device may initiate the connection with the zone computer and then engage in authentication and then validation. Authentication in either case may include determination of keys for secure communication.

At step 13 shown in FIG. 4, validation is performed. Validation may be performed the same way regardless of how detection was performed. For example, the zone computer makes a decision on whether the user is validated based on data exchanged with the mobile device, equipment operational data, and/or real-time services hosted on a backend. The equipment operational data may include fare rules (different fare types, concession types, fare validity window, etc.), transfer rules, location information (e.g., zone computer location), etc. The real-time services may include fare payment. In another example, the backend may store authorization information for individuals to determine whether the user is cleared to be in the validation area 101. The decision of whether the user is validated is communicated to the user, such as through a display connected to the zone computer or through the mobile device. For example, the zone computer may send information to the validation and enforcement application related to the validation decision and/or the user's account (e.g., new balance, transaction summary, etc.). The validation and enforcement application may communicate the decision to the user using inbuilt features like haptic feedback, audio notification, visual notification, etc., based on user's preferences.

FIG. 5 shows details of the steps of FIG. 4 and illustrates the interaction between the devices in the system 100 performing the steps. For example, assume user 131a is entering zone 1 and has mobile device 130a running validation application 132a, such as shown in FIGS. 1 and 2. The mobile device 130a interacts with beacons 140a-d and zone computer 150a when performing the steps.

The beacons 140a-d periodically broadcast their unique IDs and optional payload indicating location. At step A, the mobile device 130a receives the broadcasts when in range. At step B, assuming the validation and enforcement application 132a is not already running, the validation and enforcement application 132a is launched for example if the operating system of the mobile device 130a recognizes the beacon IDs as registered beacon IDs. For example, beacon IDs that have a predetermined UUID, major ID and/or minor ID invoke launching of the validation and enforcement application 132a. If tap-based detection is used, the validation and enforcement application 132a may be launched if the user taps on or near a beacon and the unique ID of the beacon is registered. At step C, the validation and enforcement application 132a enters detection mode to determine whether it is in a zone, such as zone 1 and whether the mobile device is in a settled state. Detection may include tap-based detection or triangulation-based detection. After detecting the mobile device 130a is in zone 1 and in a settled state, the validation and enforcement application 132a enters activation mode to calculate the unique ID of the mobile device 130 based on information derived from the signals of the beacons 140a-d. The validation and enforcement application 132a enters peripheral mode and a message with the unique ID of the mobile device is broadcasted or sent to a local zone computer, e.g., zone computer 150a, at step E. The broadcast may be a short range broadcast, such as using BLE or Bluetooth.

At step F, the zone computer 150a receives the message with the mobile device unique ID from the mobile device 130a assuming it is within range, and determines whether the mobile device 130a is within the area of validation of the zone computer 150a. An example of the area of validation may be a zone, such as zone 1. The zone computer 150a uses the distance, signal strength and optionally the azimuth and angle of the mobile device 130a, which may be determined from the received message, to determine whether the mobile device 130a is in its area of validation. For example, in addition to receiving the message from the mobile device 130a, the zone computer 150a may receive a message from a mobile device in zone 2. However, the zone computer 150a determines that only the mobile device 130a is currently in its area of validation, i.e., zone 1. Accordingly, the zone computer 150a communicates with the mobile device 130a for validation but not the mobile device in zone 2 at this instant.

At step G, if the mobile device 130a is determined to be in zone 1, the zone computer 150a initiates communication with the mobile device 130a. For example, the zone computer 150a sends an acknowledgment message to the mobile device 130a that includes the mobile device unique ID so the mobile device 130a knows that the zone computer 150a is ready to proceed to validation. In another example, the zone computer 150a may broadcast or transmit an acknowledgment message that is encrypted with the mobile device unique ID to the mobile device 130a. Only the mobile device 130a can decrypt the acknowledgment message sent from the zone computer 150a because no other mobile device knows the key. In yet another example, the zone computer 150a and the mobile device 130a calculate the mobile device unique ID independently using the same inputs and the same function. For example, the inputs for the unique ID calculation function described above may be determined by the mobile device 130a and broadcasted or sent to the zone computer 150a with the mobile device unique ID. Both the zone computer 150a and the mobile device 130a store the same function for calculating the mobile device unique ID. The zone computer 150a also calculates the mobile device unique ID. The zone computer 150a determines if the received mobile device ID matches the calculated mobile device ID to determine whether to continue with the process, e.g., initiate communication, authentication and validation.

Mutual authentication is performed at step H. The mobile device 130a and the zone computer 150a may exchange messages for authentication to establish identities of both sides. The mutual authentication might result in a generation of a key or set of keys that are then used for further encryption, decryption, enciphering, deciphering, etc. A conventional key encryption algorithm may be used.

At step I, the zone computer 150a determines whether the mobile device 130a or its user 131a is validated. Validation may include exchanging messages with a backend server not shown and/or the mobile device 130a to get the information needed to perform validation. In one example, validation may include a fare payment determination and the zone computer 150a may determine whether the fare can be paid from a user account for the user 131a. At step J, validation results are returned to the mobile device 130a. The zone computer 150a may also send information to the related to the user's account (e.g., new balance, transaction summary, etc.). At step K, if the user 131a is validated, e.g., a fare is paid, the validation and enforcement application 132a can mute itself from the beacons in the same fare paid zone to prevent from being double-charged for the duration of the fare validity. If the validation is denied, the zone computer 150a can display an indication on a display that validation failed. If the user 131a is validated, the zone computer 150a can display an indication that the user 131a is validated.

After steps E and F are performed, keys may be used for secure communication. As described above, keys may be used to encrypt messages between the mobile device 130a and the zone computer 150a. Accordingly, the key may be used for secure communication between the mobile device 130a and the zone computer 150a. Also, the mobile device unique ID and/or the key are run-time. For example, they may be generated in real-time for the validation process and are only valid for the current time and location and for the particular mobile device. This provides additional security by improving the robustness of the key. In another example, MACing might be used to secure the communication between the mobile device 130a and the zone computer 150a. In another example, both encryption and MACing might be used to secure the communication between the mobile device 130a and the zone computer 150a.

At step I, validation may vary depending on whether information for validation is stored locally or stored in a backend server. For example, for a "stored value" system, information for validation is stored locally on the mobile device in a secure manner. For example, information, such as user profile, balance amount, passes and concession information are stored securely on the mobile device. In a "credential" systems, the information is stored on a backend server (e.g., the cloud), and the mobile device only stores credentials, such as user account number, and the information is retrieved from the backend server in real time for completing validation or enforcement of transactions.

Figure 6:
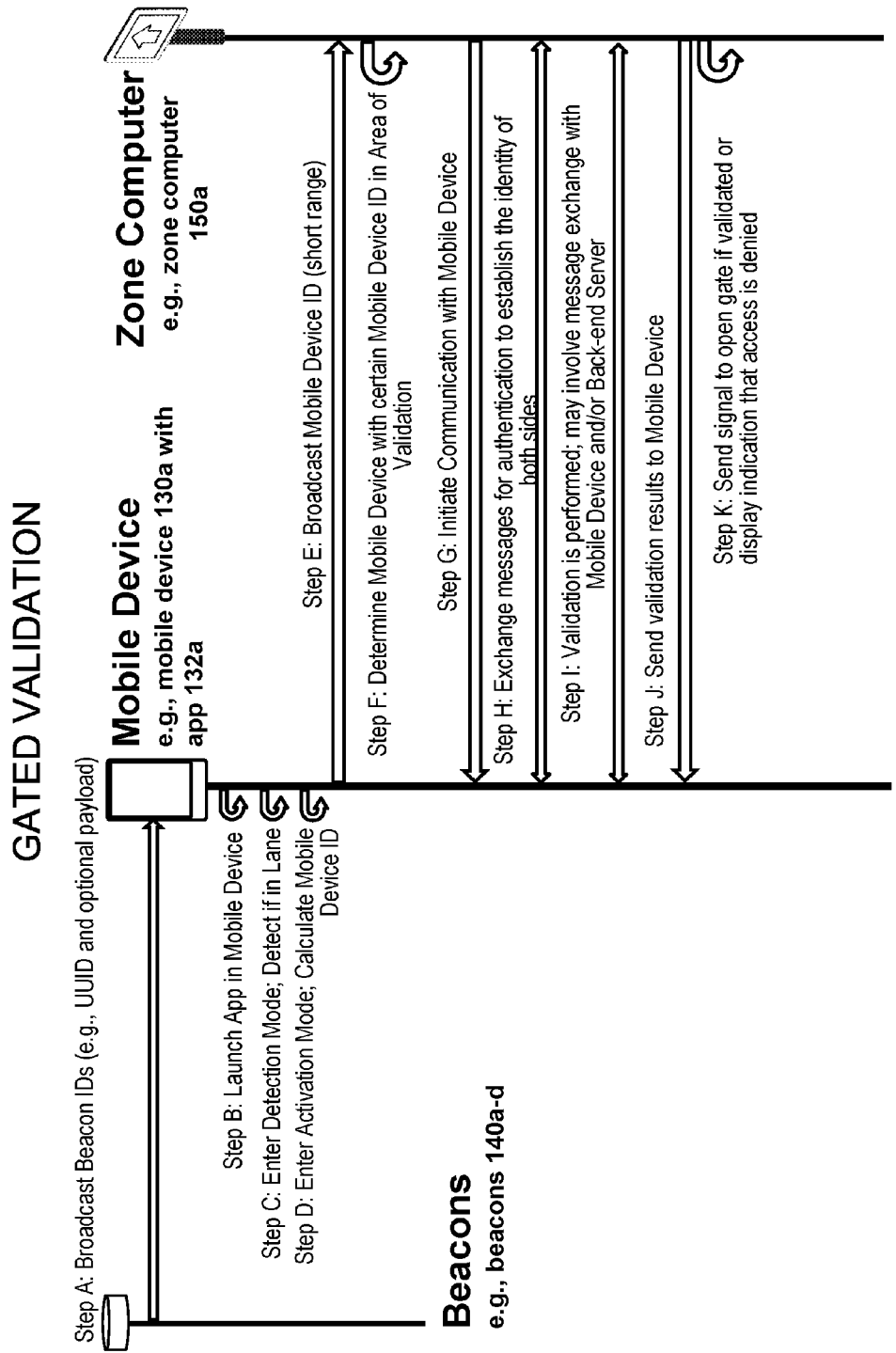

FIG. 6 shows details of the steps of FIG. 4 for a gated validation and enforcement area, such as shown in FIG. 3. For example, in FIG. 3, assume user 131a is entering lane 110a and has mobile device 130a running validation and enforcement application 132a, such as shown in FIGS. 1 and 2. The mobile device 130a interacts with beacons 140a-d and zone computer 150a when performing the steps.

The beacons 140a-d periodically broadcast their unique IDs and optional payload indicating location. At step A, the mobile device 130a receives the broadcasts when in range. At step B, if the validation and enforcement application 132a isn't already running, the validation and enforcement application 132a is launched for example if the operating system of the mobile device 130a recognizes the unique IDs of the beacons as registered unique IDs. For example, beacon IDs that have a predetermined UUID and/or major ID and/or minor ID invoke launching of the validation and enforcement application 132a. If tap based detection is used for the beacons, the validation and enforcement application 132a may be launched if the user taps on or near a beacon and the unique IDs of the beacon is registered. At step C, the validation and enforcement application 132a enters detection mode to determine whether it is in a lane, such as lane 110a. Detection may include tap-based detection or triangulation-based detection. After detecting the mobile device 130a is in lane 110a, the validation and enforcement application 132a enters activation mode to calculate the unique ID or IDs based on information from the beacons and a message with the unique ID or IDs may be broadcasted or sent to a local zone computer, e.g., zone computer 150a, at step E. For example, a mobile device unique ID, which includes the calculated unique ID or IDs, is broadcasted by the mobile device 130a. The broadcast may be a short range broadcast, such as using BLE, Bluetooth 4.0.

At step F, the zone computer 150a receives the broadcasted message with the mobile device unique ID from the mobile device 130a assuming it is within range, the zone computer 150a validates that the broadcasted message contains the unique ID or IDs related to the sub-location and determines whether the mobile device 130a is within the area of validation of the zone computer 150a. An example of the area of validation is shown in FIG. 3, such as the lane 110a. The zone computer 150a uses the distance, signal strength and optionally the azimuth and angle of the mobile device 130a, which may be determined from the received message, to determine whether the mobile device 130a is in its area of validation. For example, in addition to receiving the message from the mobile device 130a, the zone computer 150a may receive a message from a mobile device around the lane 110b. However, the zone computer 150a determines that only the mobile device 130a is currently in its area of validation, i.e., lane 110a or has the correct unique ID or IDs. Accordingly, the zone computer 150a will only communicate with the mobile device 130a for validation at this instant.

At step G, if the mobile device 130a is determined to be in lane 110a, the zone computer 150a initiates communication with the mobile device 130a using the unique ID or IDs as a reference. For example, the zone computer 150a sends an acknowledgment message to the mobile device 130a that includes the mobile device unique ID so the mobile device 130a knows that the zone computer is ready to proceed to validation. In another example, the zone computer 150a may broadcast or transmit an acknowledgment message that is encrypted with a key to the mobile device 130a. Only the mobile device 130a can decrypt the acknowledgment message sent from the zone computer 150a because no other mobile device knows the key. In yet another example, the zone computer 150a and the mobile device 130a calculate the mobile device unique ID independently using the same inputs and the same function. For example, the inputs for the unique ID calculation function described above may be determined by the mobile device 130a and broadcasted or sent to the zone computer 150a with the mobile device unique ID. Both the zone computer 150a and the mobile device 130a store the same function for calculating the mobile device unique ID. The zone computer 150a also calculates the mobile device unique ID. The zone computer 150a determines if the received mobile device ID matches the calculated mobile device ID to determine whether to continue with the process, e.g., initiate communication, authentication and validation.

Mutual authentication is performed at step H. The mobile device 130a and the zone computer 150a may exchange messages for authentication to establish identities of both sides. The mutual authentication might result in a generation of a key or set of keys that are then used for further encryption, decryption, enciphering, deciphering, etc. A conventional key encryption algorithm may be used.

At step I, the zone computer 150a determines whether the mobile device 130a or its user 131a is validated. Validation may include exchanging messages with a backend server not shown and/or the mobile device 130a to get the information needed to perform validation. In one example, validation may include a fare payment determination and the zone computer 150a may determine whether the fare can be paid from a user account for the user 131a. At step J, validation results are returned to the mobile device 130a. At step K, the zone computer 150a sends a signal to open gate 160a for the lane 110a if the user 131a is validated. The signal may be an internal signal if the gate 160a is part of the system 100 or it may be transmitted to an external system if the gate 160a is part of an external system. If the validation is denied, the zone computer 150a can display an indication on the display 151a that access to the restricted area is denied. If the user 131a is validated, the zone computer 150a can display an indication on the display 151a that the they are approved to access (or exit) the restricted area.

After steps E and F are performed, keys may be used for secure communication. As described above, the keys may be used to encrypt or encipher the messages between the mobile device 130a and the zone computer 150a. Accordingly, the key may be used for secure communication between the mobile device 130a and the zone computer 150a. Also, the mobile device unique ID and/or the key are run-time. For example, they may be generated in real-time for the validation process and are only valid for the current time and location and for the particular mobile device. This provides additional security by improving the robustness of the key. In another example, MACing might be used to secure the communication between the mobile device 130a and the zone computer 150a. In another example, both encryption and MACing might be used to secure the communication between the mobile device 130a and the zone computer 150a.

Figure 7:
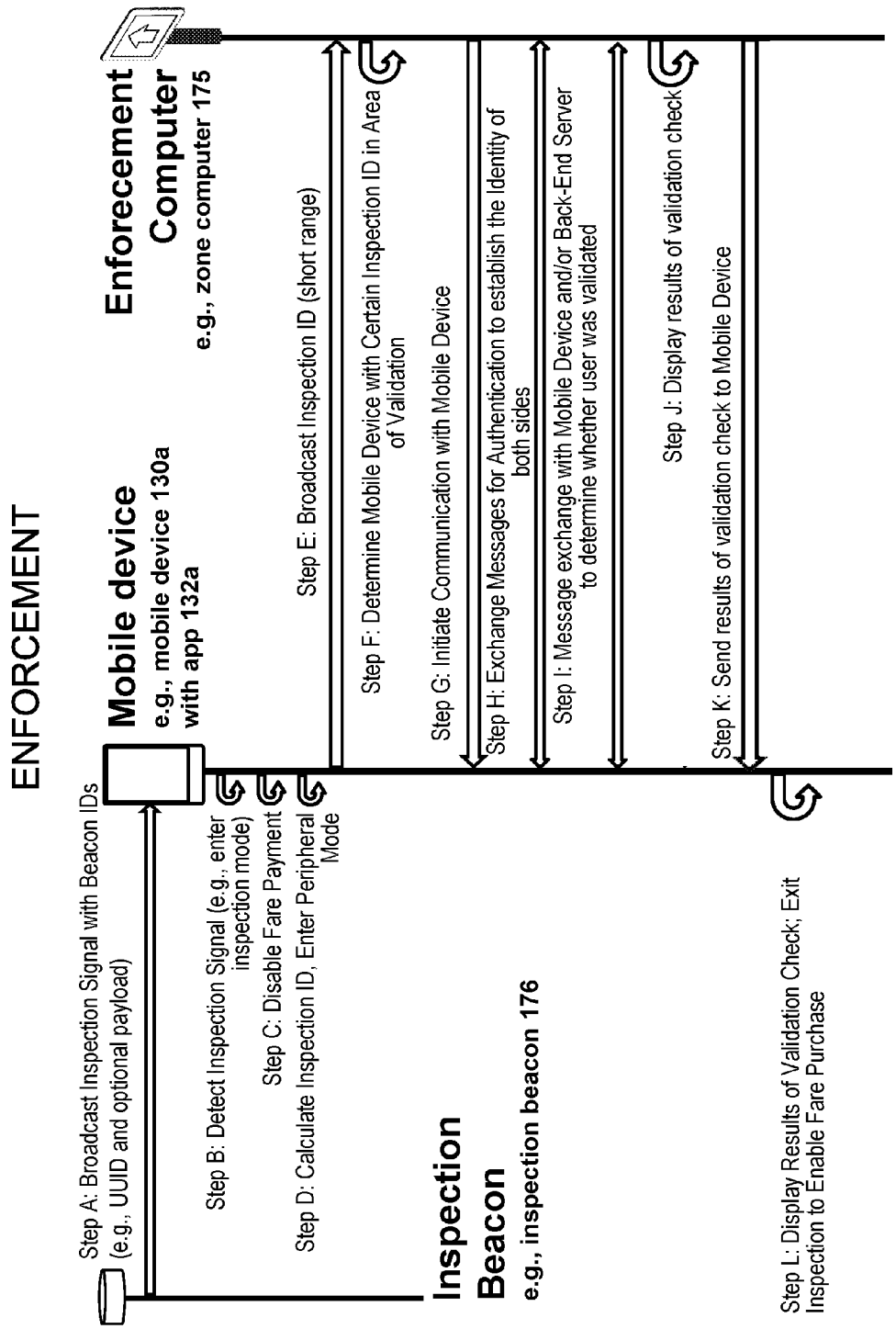
FIG. 7 shows additional details of the steps for validation checks, according to an example of the present disclosure.

FIG. 7 shows detailed steps for enforcement. The steps shown in FIG. 4 for validation are also applicable for enforcement. Referring to FIG. 4, steps are shown for detection at step 10, activation at step 11, exchange at step 12 and validation at step 13. For enforcement, at detection step 10, the mobile devices 130 determine whether they are in proximity to the enforcement computer 175 based on an inspection signal received from the inspection beacon 176 shown in FIG. 1. A unique mobile device ID is calculated for each mobile device at activation step 11 based on the inspection signal. At exchange step 12, messages are exchanged between the mobile devices 130 and the enforcement computer 175 using the mobile device ID and via short distance communication interfaces to determine whether the mobile devices have been validated, e.g., whether fares have been paid. The enforcement computer 175 may communicate with a backend server to determine whether a user is currently validated. For example, the backend server may store a list of users that have paid the fare and when they paid fare and details describing what the fare payment was for. At step 13, a determination is made as to whether the user was previously validated and an indication of whether the user was validated is displayed on the enforcement computer 175, and a message may be sent from the enforcement computer 175 to the mobile device with the indication. FIG. 7 shows details of these steps 10-13.

The steps of FIG. 7 are described with respect to FIG. 1 and show the interaction between the mobile device 130a, the inspection beacon 176, and the enforcement computer 175. At step A, the inspection beacon 176 broadcasts an inspection signal. The inspection signal for example includes a UUID, a major ID and/or a minor ID, such as described above with respect to the signals broadcasted from the beacons 140. An inspection beacon for example announces that the enforcement individual 176 (e.g., an inspection officer that checks if fares have been paid) is in the vicinity by broadcasting the inspection signal. The inspection signal is distinguished from signals broadcasted from the beacons 140 for example based on information in the UUID, major ID and/or minor ID that identifies the signal as an inspection signal to the mobile devices 130.

In one example, the enforcement computer 175 may be a mobile device that includes the inspection beacon 176. In another example, the enforcement computer 175 sends a signal to the beacons 140 to place them in inspection mode, and the beacons 140 broadcast the inspection signals.

At step B, the validation and enforcement application 132a on the mobile device 130a detects the inspection signal and disables any features for buying fare products or making fare payment at step C. This prevents the "mischievous" user from only paying the fare if they are being inspected or if they sense they will be inspected. For example, the validation and enforcement application 132a allows the user 131a to create and login to an account for fare payment which may be stored and managed by a backend system (not shown). The user may enable and disable auto payment, pay a fare on demand, link a credit card or bank account to the account, etc. The fare payment feature of the validation and enforcement application 132a is disabled so a user cannot buy fare products or pay a fare through the validation and enforcement application 132a when the inspection signal is received by the mobile device 130a and detected by the validation and enforcement application 132a. When, the inspection signal is received, the validation and enforcement application 132a operates in inspection mode and disables fare payment features and fare products buying features. The inspection signal may include a UUID or a major ID that are registered to invoke launching the validation and enforcement application 132a if it is not already running. The validation and enforcement application 132a may already be running because validation may have recently occurred. Also, the inspection signal is recognized by the validation and enforcement application 132a as an inspection signal for example based on a code in the major ID or in the minor ID.

In one example, the inspection signal broadcasted from the inspection beacon 176 is a Bluetooth or BLE signal. In another example, tap-based detection is performed and the inspection signal may be a Bluetooth or BLE signal tuned for a shorter distance, such as 3-4 centimeters. For tap-based detection, the user 131a may tap the mobile device 130a on the enforcement computer 175 carried by the enforcement person 177 to receive the inspection signal. The inspection signal in both examples includes the UUID, major ID and/or the minor ID and may include other information, such as signal strength, location information, etc.

At step D, the validation and enforcement application 132a calculates a unique inspection ID based on information derived from the inspection signal. The validation and enforcement application 132a enters peripheral mode and a message with the inspection ID is broadcasted or sent to the enforcement computer 175 at step E. The broadcast may be a short range broadcast, such as using BLE, Bluetooth, or NFC.

Similar to the unique mobile device ID derived for validation, such as described with respect to step D in FIGS. 5 and 6, the inspection ID may be calculated using the major ID, minor ID and optional payload from the inspection signal. Location information may be used to calculate the inspection ID. Location information may be derived from information in the UUID or the payload of the inspection signal if it is provided. Location information may be determined by the mobile device 130a for example from internal location sensors, such as GPS, or from triangulation determined from signals received from local beacons, such as the beacons 140a-d. Thus, the inspection ID may be unique to the mobile device 130a at its current location. Examples of ID calculation functions are described above.

At step F, the enforcement computer 175 receives the inspection ID from the mobile device 130a assuming it is within range, and determines whether the mobile device 130a is within an area of inspection of the enforcement computer 175. An example of an area of inspection may be an area within a one meter radius of the current location of the enforcement computer 175. The area of inspection may be smaller if tap-based detection was used at step B, such as 5-10 centimeter radius. The enforcement computer 175 may use the distance, signal strength and optionally the azimuth and angle of the broadcasted signal from the mobile device 130a to determine the location of the mobile device 130a and whether it is in the area of inspection.

At step G, if the mobile device 130a is determined to be in the area of inspection, the enforcement computer 175 initiates communication with the mobile device 130a using the inspection ID. For example, the enforcement computer 175 sends an acknowledgment message to the mobile device 130a that includes the inspection ID so the validation and enforcement application 132a in the mobile device 130a knows that the enforcement computer 175 is ready to proceed to checking the validation of the user 131a. In another example, the enforcement computer 175 may broadcast or transmit an acknowledgment message that is encrypted with a key to the mobile device 130a. Only the mobile device 130a can decrypt the acknowledgment message sent from the enforcement computer 175 because no other mobile device knows the key. In yet another example, the enforcement computer 175 and the mobile device 130a calculate the inspection ID independently using the same inputs and the same function. For example, the inputs for the inspection ID calculation function described above may be determined by the mobile device 130*a* and broadcasted or sent to the enforcement computer 175 along with the inspection ID calculated by the mobile device 130*a*. Both the enforcement computer 175 and the mobile device 130*a* store the same function for calculating the unique inspection ID. The enforcement computer 175 also calculates the inspection ID. The enforcement computer 175 determines if the received inspection device ID that is calculated matches the received inspection ID to determine whether to continue with the process, e.g., initiate communication, authentication and validation determination.

Mutual authentication is performed at step H. The mobile device 130*a* and the enforcement computer 175 may exchange messages for authentication to establish identities of both sides. The mutual authentication may include generation of a key or set of keys that are then used for further encryption, decryption, enciphering, deciphering, etc. A conventional key encryption algorithm may be used.

At step I, the enforcement computer 175 and the mobile device 130*a* exchange messages to determine whether the user 131*a* was validated. Validation checking may include exchanging messages with a backend server not shown and/or the mobile device 130*a* to get the information needed to check validation. In one example, checking validation may include a determination of whether a fare was paid. Messages exchanged for validation checking are referred to as inspection messages.

For example, the validation and enforcement application 132*a* on the mobile device 130*a* may receive a transaction summary from a back end server if a fare was paid. The enforcement computer 175 may request the transaction summary from the validation and enforcement application 132*a*, and receive it in response to the request. The enforcement computer 175 may determine from the details of the transaction summary whether the fare was paid for the current area or ride. For example, the transaction summary may include time of the transaction, location where transaction occurred, and type of ticket that was purchased. From the details of the transaction summary, the enforcement computer 175 determines whether the fare was paid. For example, if the fare was for a single ride ticket valid for the current day to any destination, then the enforcement computer 175 determines the user 131*a* was validated. In another example, the validation and enforcement application 132*a* sends a message that automatic payment is enabled, and the fare will be deducted from the user account when the destination is reached.

The enforcement computer 175 may get transaction information from a backend server to check validation. For example, the validation and enforcement application 132*a* may send an ID for the user account of the user 131*a* to the enforcement computer 175. Using the account ID, the enforcement computer 175 may request fare payment information or an indication of whether the user 131*a* paid the fare from the backend server that stores user account information.

At step J, the results of the validation check are displayed for example on the enforcement computer 175 so the enforcement person 177 can view the results and take appropriate action if needed. Appropriate action if the fare was not paid may include having the user 131*a* make payment, pay a penalty fee, issue a ticket indicating notice of failed validation to the user, and/or remove the user 131*a* from the validation and enforcement area 101. If the results indicate that the fare was paid, the enforcement computer 175 may mark the ticket as consumed and inspected if it is a single ride ticket, and send information of the marked ticket to the backend server.

At step K, the results of the validation check are sent to the mobile device 130*a*, and the validation and enforcement application 132*a* may display or notify the user 131*a* of the results of the validation check through another type of input/output device at step L. After the results of the validation check are received or an acknowledgement is received from the enforcement computer 175 or the backend server that a validation check has been performed, the validation and enforcement application 132*a* may exit the inspection mode, thus enabling the fare purchase feature of the validation and enforcement application 132*a*. The user 131*a* may pay the fare if the validation check indicates the fare was not paid.

After steps E and F are performed, encryption keys may be used for secure communication. As described above, the encryption keys may be used to encrypt messages between the mobile device 130*a* and the enforcement computer 175 or the inspection ID may be included in the messages and the information in the messages is only accepted if it includes the correct inspection ID. Accordingly, the inspection ID and/or encryption keys may be used for secure communication between the mobile device 130*a* and the enforcement computer 175. Also, the inspection ID and/or the encryption keys may be run-time, i.e., generated in real-time and are only valid for the current time and location and mobile device. This provides additional security.

Figure 8:
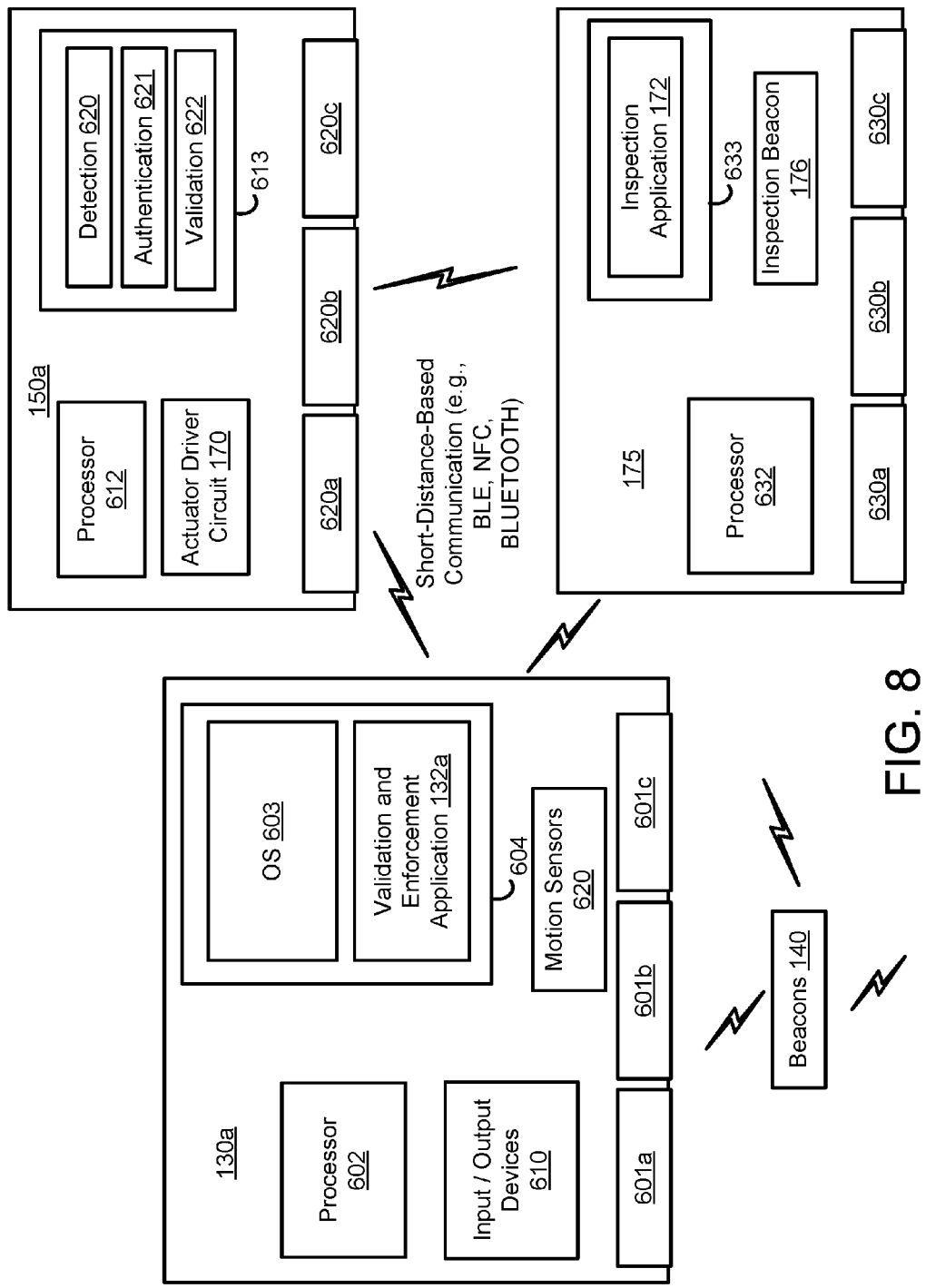
FIG. 8 illustrates a block diagram of the a secure short-distance-based communication and validation system, according to an example of the present disclosure.

FIG. 8 shows block diagrams of the mobile device 130*a*, the zone computer 150*a*, and the enforcement computer 175 of the system 100 but is representative of any of the mobile devices, zone computers and enforcement computers that may be used in the system 100. Also, some of the components of the mobile device 130*a*, the zone computer 150*a*, and the enforcement computer 175 are shown, and it will be apparent to one of ordinary skill in the art that the devices and computers may include other components not shown.

The mobile device 130*a* may include multiple interfaces 601, wired or wireless, for communicating with other devices. For example, interface 601*a* may be a Wi-Fi interface or a cellular interface or may include both interfaces. The interface 601*a* for example is a network interface that can communicate with a backend server via a network. 601*b* may include a Bluetooth interface. In one example, message exchanges between the mobile device 130*a* and the zone computer 150*a* are done through Bluetooth and the interface 601*b* but other interfaces may be used, such as BLE, Bluetooth 4.0 or other future versions of Bluetooth or NFC. Similarly, message exchanges between the mobile device 130*a* and the enforcement computer 175 are done through Bluetooth and the interface 601*b* but other short-distance interfaces may be used, such as Bluetooth 4.0 or other future versions of Bluetooth or NFC. Interface 601*c* may be a NFC interface, but the mobile device 130*a* may have both Bluetooth and NFC interfaces and multiple other interfaces. Interface 601*b* may be for communicating with the beacons 140, for example, for triangulation-based or tap-based detection.

The mobile device 130*a* includes a processor 602 and data storage 604. The processor 602 for example is an integrated circuit. The processor 602 may be a chipset with central processing unit and/or custom processing circuits, such as an application-specific integrated circuit (ASIC) or field-programmable gate array (FPGA). The processor 602 may run an operating system (OS) 603 and applications, including validation and enforcement application 132*a*, for the mobile device 130a. The OS 603 and the applications are stored in data storage 604. Any information used by the validation and enforcement application 132a and the OS 603 may be stored in the data storage 604. For example, the data storage 604 may store registered UUIDs for determining whether to launch the validation and enforcement application 132a in response to receiving a beacon signal with a registered UUID. The data storage 604 may store transaction summaries for purchased fare tickets that can be used for checking validation. Also, the data storage 604 may store keys, location information, movement information determined from motion sensors 620, etc. The data storage 604 may include memory and/or non-volatile data storage.

The mobile device 130a includes input/output (I/O) devices 610, such as keyboard, touch screen display, speaker, etc. The I/O devices 610 may provide audio, visual and/or tactile output to indicate whether a user has been validated or results of a validation check. The mobile device 130a also includes motion sensors 620. Examples of motion sensors 620 may include accelerometer, gyroscope, and/or a motion co-processor. Information from the motion sensors 620 may indicate information or measurements of the motion of the mobile device 130a. This information may be used to determine whether the mobile device 130a is in a settled state.

The zone computer 150a includes a processor 612 and a data storage 613. The processor 612 is an integrated circuit. The processor may execute software or firmware or comprise custom processing circuits, such as an application-specific integrated circuit (ASIC) or field-programmable gate array (FPGA). The data storage 613 may include memory and/or non-volatile data storage. The data storage 613 may store software or firmware including machine readable instructions and may store any information used by the zone computer 150a. The software or firmware may include subroutines or an application for detection 620, authentication 621 and validation 622, such as described with respect to FIGS. 4-6. The zone computer 150a may include I/O devices or be connected to an I/O device, such as a display, to provide indication to the user of whether they are validated.

The zone computer 150a also includes multiple interfaces 620, wired or wireless, for communicating with other devices. For example, interface 620a may be a Wi-Fi interface or a cellular interface or may include both interfaces. 620b may include a Bluetooth or Bluetooth 4.0 or BLE interface. In one example, message exchanges between the mobile device 130a and the zone computer 150a are done through a Bluetooth but other interfaces may be used. 620c may be a NFC interface, but the mobile device 130a may have both BLE and NFC interfaces. The interfaces 620b and 620c are short-distance communication interfaces. A short-distance communication interface may have a communication range of few meters (e.g., Bluetooth or BLE) or centimeters (e.g., NFC). The range is generally much shorter than Wi-Fi or cellular. The short-distance communication interface may cover a sub-location or a sub-location and its adjacent sub-location. The zone computer 150a may connect via a network interface of interfaces 620 to a server backend via the Internet or another wide area network or a local area network for validation, which may include fare payment.

If the zone computer 150a is used in a gated environment, such as shown in FIG. 3, it may include an actuator driver circuit 170 to control actuation of the physical barrier for the sub-location of the zone computer. In response to determining the user is validated, the zone computer 150a sends a signal to the actuator driver circuit 170 to invoke opening of the physical barrier, such as gate 160a for lane 110a. For example, the processor 612 validates a user associated with the mobile device 130a and sends a signal to the actuator driver circuit 170. The actuator driver circuit 170 drives an actuator of the gate 160a to open the gate 160a shown in FIG. 3. The processor 612 may also drive the circuit 170 to close the gate 160a. In one example, the global positioning system (GPS) sensor on the mobile device may be used to determine when the user enters and exits the mass transit system in order to determine the fare amount and open the gate 160a if the fare is paid when the user is exiting.

The enforcement computer 175 includes a processor 632 and a data storage 633. The enforcement computer 175 may be a mobile device or a stationary computer. The processor 632 is an integrated circuit. The processor may execute software or firmware or comprise custom processing circuits, such as an application-specific integrated circuit (ASIC) or field-programmable gate array (FPGA). The data storage 633 may include memory and/or non-volatile data storage. The data storage 633 may store software or firmware including machine readable instructions and may store any information used by the enforcement computer 175. The software or firmware may include the inspection application 172 that performs the functions described above with respect to FIG. 7.

The enforcement computer 175 also includes multiple interfaces 630, wired or wireless, for communicating with other devices. For example, interface 630a may be a Wi-Fi interface or a cellular interface or may include both interfaces. The interface 630a for example is a network interface that can communicate with a backend server via a network. 630b may include a Bluetooth interface and 630c may be a BLE or NFC interface or some other type of short-distance interface, but the enforcement computer 175 may have both BLE and NFC interfaces.

The enforcement computer 175 may include the inspection beacon 176 that broadcasts the inspection signal or the inspection beacon 176 may be a separate device from the enforcement computer 175. The beacons 140 are also shown. As stand-alone devices, the beacons 140 and/or the inspection beacon 176 may include circuits that may be programmed with a UUID and an interface for broadcasting their signals. In one example, the inspection beacon 176 and the beacons 140 may broadcast their signals using Bluetooth. If the beacons 140 and/or the inspection beacon 176 are incorporated in the zone computer 150a or the enforcement computer 175, they may use the interface of the computer for their broadcasts. Also, exchange of messages between the mobile device 130a, the zone computer 150a and the enforcement computer 175 may be through Bluetooth.

Figure 9:
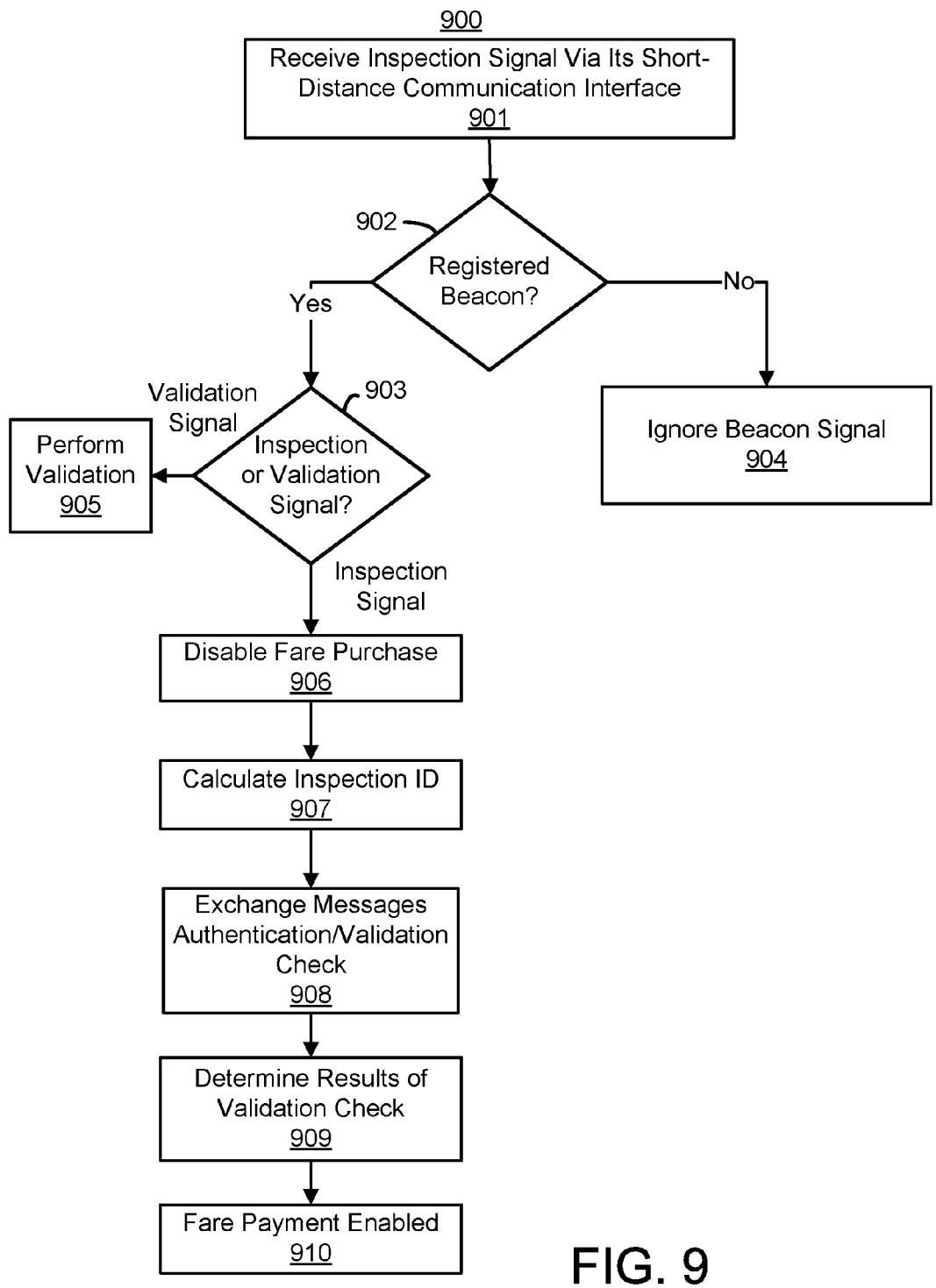
FIGS. 9 and 10 illustrate flowcharts of methods performed for validation and enforcement, according to examples of the present disclosure.

FIG. 9 shows a flowchart of a method 900 that may be performed by a mobile device, such as the mobile device 130a in the system 100, for checking validation. The method 900 is described by way of example with respect to the system 100 shown in FIG. 1 but may be performed in other systems. At 901, the mobile device 130a receives a signal from a beacon via its short-distance communication interface, such as via BLE or NFC. For example, the inspection beacon 176 broadcasts an inspection signal and it is received by the mobile device 130a.

At 902, the mobile device 130a determines whether the received beacon signal is from a registered beacon. For example, the OS 603 running on the mobile device 130a determines whether the UUID or major ID in the received beacon signal is from a registered UUID or major ID. If the received beacon signal is from a registered beacon, the information for the beacon signal is sent to the validation and enforcement application 132a. If the validation and enforcement application 132a is not running, the OS 603 launches the validation and enforcement application 132a and sends the inspection signal information to the validation and enforcement application 132a. The mobile device 130a stores the registered beacon IDs (e.g., the major IDs) for the beacons 140 and the inspection beacon 176 so the OS 603 recognizes their beacon signals. At 904, if the beacon signal is not recognized it is ignored.

At 903, the validation and enforcement application 132a determines whether the received beacon signal is a validation signal or an inspection signal. A code in the beacon signal may identify it as a validation signal or an inspection signal. The validation signal is a beacon signal sent by one or more of the beacons 140, and may be used to invoke validation, such as described in FIGS. 4-6. If the beacon signal is a validation signal, at 905, validation is performed such as described with respect to FIGS. 4-6. For example, a unique mobile device ID is calculated based on information in the beacon signal and is used to deduct the fare.

If the beacon signal is an inspection signal, such as from the inspection beacon 176, then a validation check is performed, such as described with respect to FIG. 7. For example, at 906, fare purchase is disabled. For example, the validation and enforcement application 132a may include a fare payment feature that allows the user 131a to pay a fare by logging into their account. This feature is disabled. Also, the buying of fare products is disabled so the user cannot enable payment through another means during inspection.

At 907, an inspection ID is calculated based on information received from the inspection signal. The inspection ID may be unique to the mobile device 130a and the current location of the mobile device 130a when the inspection ID is calculated. At 908, messages are exchanged with the enforcement computer 175 using the inspection ID and one or more encryption keys via a short-distance communication interface (e.g., Bluetooth) to authenticate the mobile device 130a and to determine whether the user 131a was validated. As discussed with respect to FIG. 7, this may include determining whether the user 131a paid the fare. Results of the validation check are determined at 909. The enforcement computer 175 may determine the results of the validation check and display them on the enforcement computer 175 and send the results to the mobile device 130a.

At 910, after the validation results are received by the validation and enforcement application 132a, the fare payment is enabled. If the user 131a was determined to not have paid the fare, the user 131a may now pay the fare through the validation and enforcement application 132a.

Figure 10:
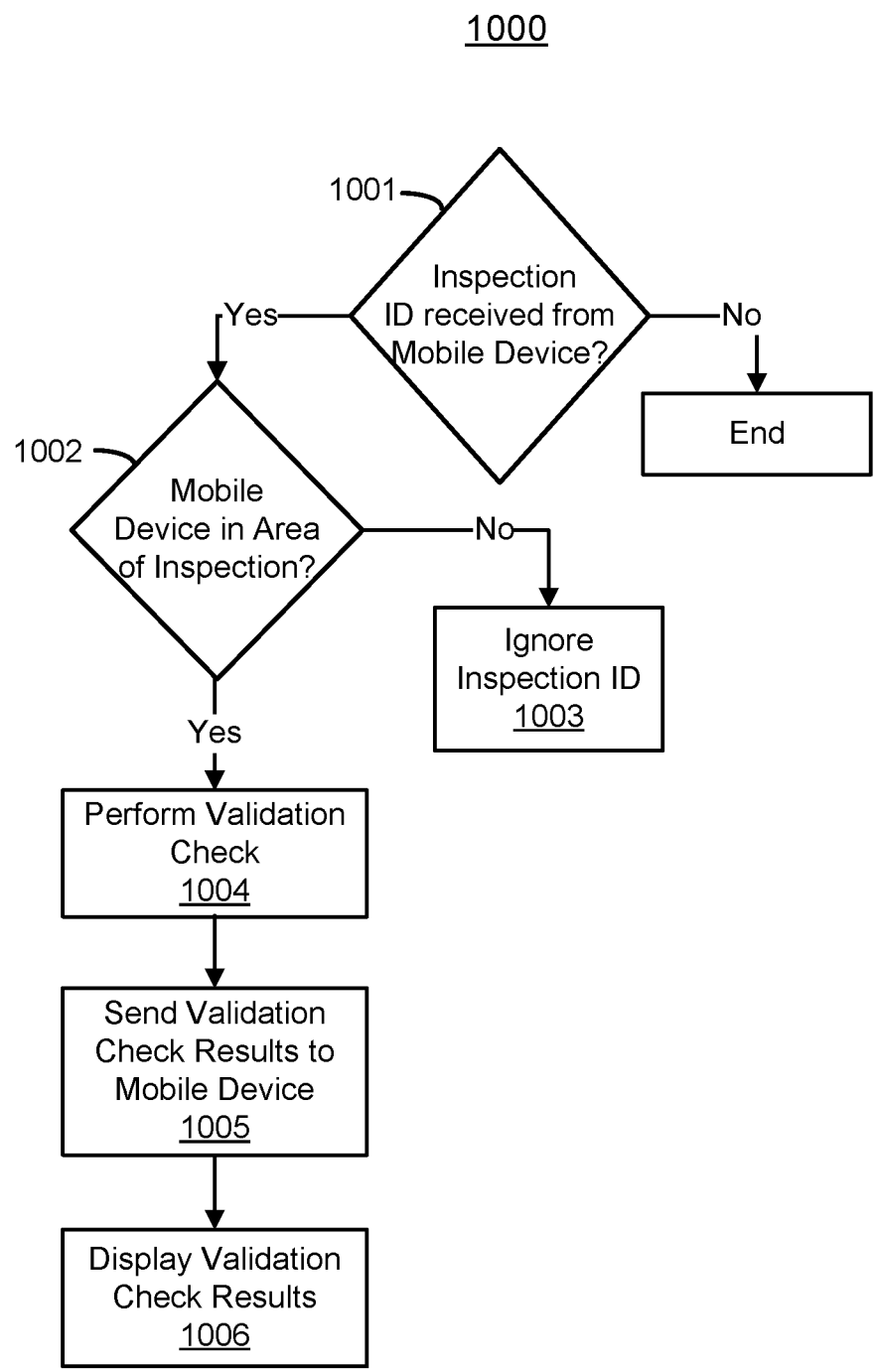

FIG. 10 shows a flowchart of a method 1000 that may be performed by an enforcement computer, such as the enforcement computer 175, in the system 100. At 1001, the enforcement computer 175 determines whether an inspection ID is received from the mobile device 130a via a short-distance communication interface of the enforcement computer 175. If the inspection ID is received, the enforcement computer 175 determines whether the mobile device 130a is in an area of inspection for the enforcement computer 175 at 1002. If tap-based detection was used, the enforcement computer 175 can determine whether the user tapped or came within close proximity (e.g., within 4-5 cm) of the enforcement computer 175. Alternatively, the enforcement computer 175 may scan for all Bluetooth mobile devices in range looking for devices which expose certain services/characteristics, and determines a mobile device is in the area of inspection based on signal strength, dwell angle, etc.

At 1003, if the mobile device 130a is not in the area of inspection, the inspection ID is ignored. If the mobile device 130a is in the area of inspection, the enforcement computer 175 determines whether the user 131a associated with the mobile device 130a was validated at 1004. At 1004, the validation is checked for example to determine whether the user 131a paid the fare.

At 1005, the enforcement computer 175 sends a message to the mobile device 130a with the validation check results that the user is validated if the user is determined to be validated. Otherwise, at 1006, a message is sent indicating validation failure. Validation results may also be displayed on a display.

Figure 11:
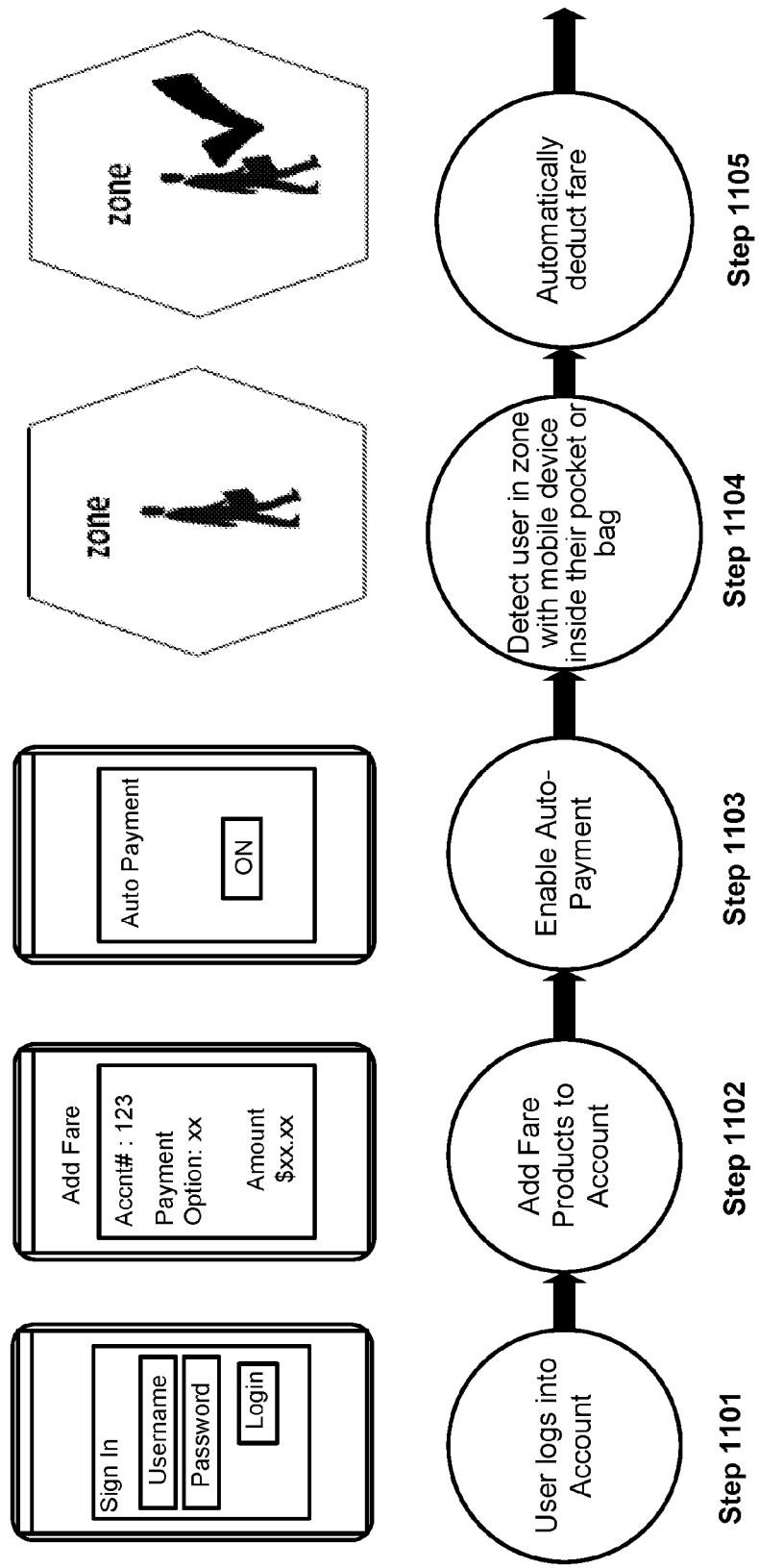
FIG. 11 illustrates a method to enable auto-payment and automatically deduct a fare using a flow of visual objects, according to an example of the present disclosure.

FIG. 11 illustrates a method 1100 to enable auto-payment via the validation and enforcement application 132a and automatically deduct the fare for validation. The validation and enforcement area 101 for example provides a fare-based service, such as a subway or train station that charges a fare to passengers that ride the train. Also, the validation and enforcement application 132a includes modules to enable fare payment. FIG. 11 shows enabling auto-payment, however, the validation and enforcement application 132a may also allow the user to pay the fare on demand in response to user input. For example, if the user enters the validation and enforcement area 101, the validation and enforcement application 132a may detect that the mobile device 130a is in the validation and enforcement application 132a and displays a screen that allows the user to select payment of the fare.

At 1101, the user 131a logs into their account. The user 131a may have to create an account if they don't have one. The validation and enforcement application 132a provides a graphical user interface on the mobile device 130a to receive a login ID and password and send the information to a backend server to login the user 131a into their account. At 1102, the validation and enforcement application 132a adds fare products to the account based on user selections. Fare products includes any goods or services for which the user is authorizing payment. At 1103, the validation and enforcement application 132a enables auto-payment of the selected fare products in response to user input. At 1104, the mobile device 130a is detected in the validation and enforcement area 101, such as a zone or a fare-gate lane. The mobile device 130a may remain in the user's pocket or bag to pay the fare, which is more convenient for the user. At 1105, the user's account is automatically deducted. The amount deducted is based on the fare scheme used by the transit entity, which may be based on distance, day pass, etc. In one example, a single fare is charged regardless of distance traveled. In another example, distance traveled or number of stops is determined to calculate the fare and the fare is deducted. To determine the distance traveled or number of stops traveled (e.g., when the user is a passenger on the train) the validation and enforcement application on the mobile device determines when the user leaves the train or leaves a train station. For example, the mobile device of the user may receive a signal via the short-distance communication interface of the mobile device from a beacon at an exit to the train station or near the exit of the vehicle that indicates the user has left the train or train station. The signal may identify the train station, so the validation and enforcement application can determine the train station where the user got on the train and the train station where the user got off the train in order to calculate the fare.

As discussed above and shown in FIG. 1, the enforcement computer 175 may be a mobile device that may be carried by an inspector or some other individual, e.g., enforcement person 177, to validate people in the validation and enforcement area 101. For example, the enforcement computer 175 is in close proximity to the mobile device 130a as shown in FIG. 1 and communicates with the mobile device 130a to check the validation of the user 131a. The enforcement computer 175 for example runs an inspection application 172 to check the validation of the users 131. The inspection beacon 176 can transmit an inspection signal to facilitate the checking of the validation of the users 131. For example, when the enforcement person 177 wants to request proof of payment of the users 131, the enforcement person 177 triggers the broadcasting of an inspection signal from the inspection beacon 176 via Bluetooth or via another short-distance wireless communication interface, and the mobile device of each user receiving the inspection signal may generate a visual indication based on the inspection signal of whether the user paid the fare or is otherwise authorized to be in the validation and enforcement area 101. The visual indication is displayed on the mobile device and may be shown to the enforcement person 177.

As discussed in further detail below with respect to FIG. 11, the visual indication of validation may comprise a flow of visual objects, and the flow of visual objects may be customized by the enforcement person 177 or another individual. A visual object is information that can be displayed on an electronic display. In an example, the electronic display may be a display of any of the mobile devices 130, the enforcement computer 175 and/or another display which may be external to the enforcement computer 175 and mobile devices 130 but located within the validation and enforcement area 101. Examples of a visual object include an image, animation, video, text, symbol, shape, picture, bar code, etc. A flow of visual objects is a sequence of visual objects. The sequence specifies an order of visual objects. The visual objects in the flow are displayable in the order of the sequence. Also, the flow of visual objects is customizable. A user, such as the enforcement person 177, may create one or more flows of visual objects and program the flows in the enforcement computer 175. Each flow may be comprised of different visual objects. Also, flows may be customizable based on flow attributes and visual object attributes. Flow attributes are applicable to the entire flow of visual objects, and may include global attributes that are applicable to all the visual objects in the flow. Examples of flow attributes may include order of the visual objects in the sequence, size to display all the visual objects, background color to display all the visual objects, etc. The visual object attributes are attributes of a specific visual object in the flow or a group or class of visual objects in the flow. The group or class may be defined by a user and may be related to a category. Examples of visual object attributes may include color, display size, font size, etc. The flow attributes and the visual object attributes may be programmable, such as through the inspection application 172 executed by the enforcement computer 175 or through another computer or server which may be remotely located from the enforcement computer 175.

The visual object that indicates whether a user is validated may be changed periodically to prevent fraud. For example, if the same visual object is always used to indicate that a user is validated, the visual object may be copied and displayed on the mobile device of a user to represent that the user has paid even when the user did not. Accordingly, use of the flow of visual objects to customize and automatically change visual objects helps prevent fraud.

Figure 12:
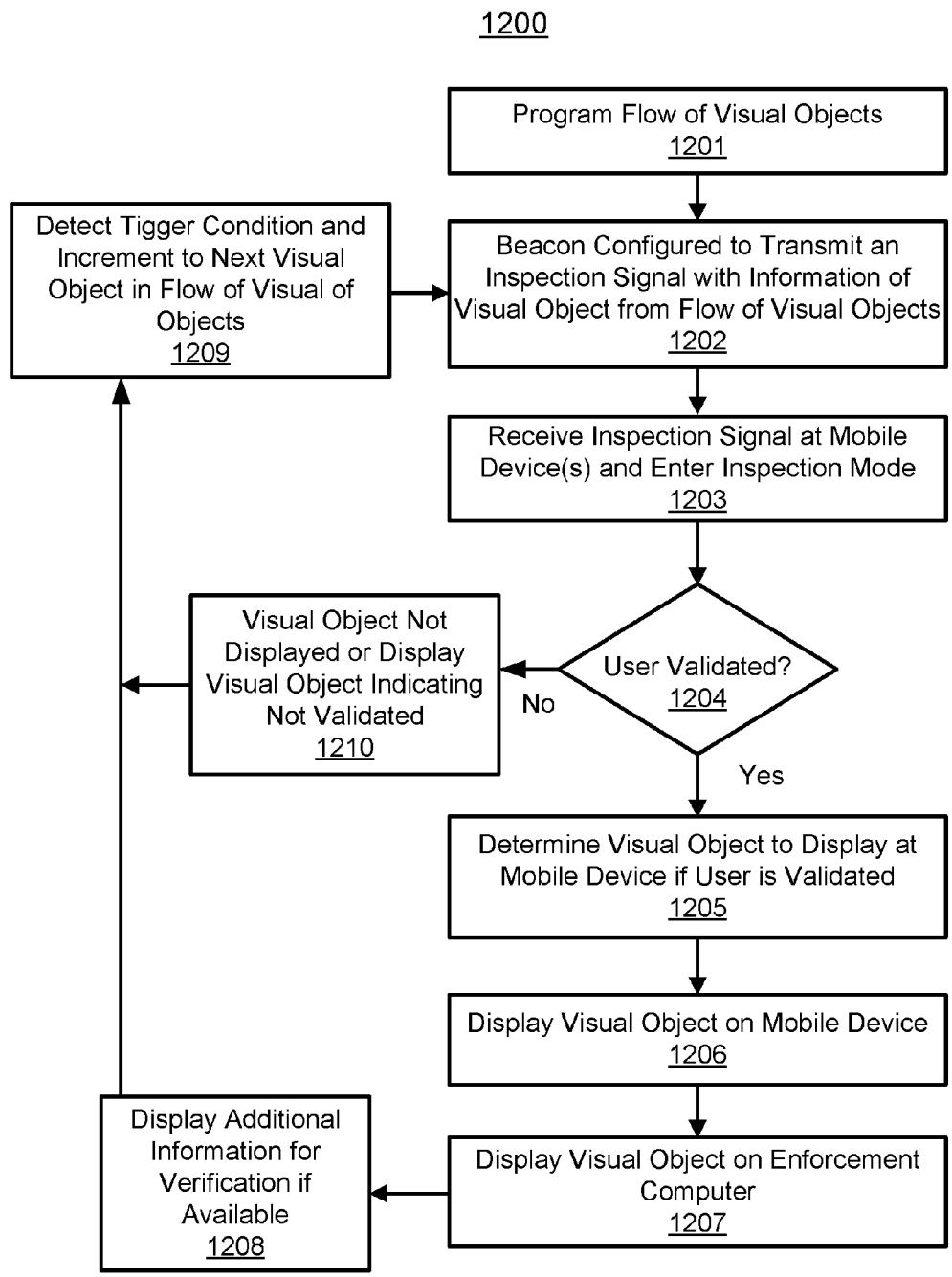
FIG. 12 illustrates a method for enforcement based on generation of a flow of visual objects, according to an example of the present disclosure.

FIG. 12 illustrates a method for enforcement based on generation of a flow of visual objects. The method of FIG. 12 is described by way of example with respect to the systems shown in FIGS. 1 and 8 but the method may be used in other systems. Referring to FIG. 1, steps of the method may be performed by the enforcement computer 175 and the mobile devices 130. For example, one or more steps may be performed by the inspection application 172 running on the enforcement computer and the validation and enforcement applications 132 running on the mobile devices 130

As indicated above, the method 1200 of FIG. 12 shows is for enforcement based on generation of visual objects. At 1201, a flow of visual objects is programmed into the enforcement computer 175. Programming the flow of visual objects may include receiving and storing user input specifying parameters for the flow. The parameters may include the visual objects to include in the flow and the sequence of the visual objects in the flow. The visual objects for the flow may be saved, for example, in the data storage (e.g., data storage 633) of the enforcement computer 175. The visual object may be created by a user, such as the enforcement person 177, and stored in the data storage. A visual object may be generated from an image captured by an image capture device of the enforcement computer 175 or of another device, or the visual object may be selected from a library of stored visual objects, or the visual object may be generated from a mathematical function, such as a shape generated based on vertices, angles and side lengths input into the function. An identifier of each visual object, such as a file name or other metadata uniquely identifying the visual object, is specified for the programming along with the sequence to display the visual objects. Other flow attributes and visual object attributes may also be programmed for the flow.

Another parameter that may be specified in the programming of the flow includes a trigger condition to increment to a next visual object in the flow. The enforcement computer 175 varies the visual object to be displayed for validations by incrementing to a next visual object in the sequence of the flow. For example, the inspection application 172 increments to a next visual object in the flow when the trigger condition is detected. Some examples of the trigger condition may include lapsing of a predetermined amount of time, detection of a new location, detection of a measured amount of movement of the enforcement computer, receiving user input via an input/output device of the enforcement computer 175, receiving a verification signal from a mobile device of a user being validated for the validation and enforcement area, etc. If the trigger condition is detected, the inspection application 172 increments to the next visual object in the flow for transmitting the inspection signal to the mobile devices 130 within the vicinity for validation.

The enforcement computer 175 may store multiple flows, and the programming of the flow may include receiving user selection of a stored flow to implement for validations. These and other parameters may be programmed for the flow.

At 1202, a beacon is configured to transmit an inspection signal via a short-distance communication interface. For example, the inspection application 172 specifies information for the programmed flow to include in an inspection signal, and triggers the inspection beacon 176 to send the inspection signal with the information. The information in the inspection signal includes information to prompt displaying of a visual object from the flow at the mobile device receiving the inspection signal in response to a validation. For example, if a user of the mobile device is validated for the validation and enforcement area 101, the visual object identified in the inspection signal will be displayed on the mobile device. The inspection beacon 176 may be part of the enforcement computer 175 or may be provided as a separate device or may be incorporated in another computer other than the enforcement computer 175. The inspection signal may be a broadcast signal.

Transmitting of the inspection signal may be triggered by detection of the programmed trigger condition and/or user input causing the inspection signal to be transmitted. For example, the enforcement person 177 may selectively trigger the transmission of the inspection signal from the inspection beacon 176. For example, the inspection application 172 running on the enforcement computer 175 receives user input from the enforcement person 177 via an input/output device of the enforcement computer 175 to start transmitting the inspection signal, such as when the enforcement person 177 wants to verify that a user or set of users in proximity to the inspection beacon 176 are validated. Also, the transmission of the inspection signal may be triggered by detection of the trigger condition, such as movement, e.g., when the vehicle moves or when the enforcement computer 175 moves. The enforcement computer 175 may be a mobile device that includes a sensor that detects movement of the enforcement computer 175. An amount of movement or rate of speed of movement of the enforcement computer 175 may be measured to trigger the broadcast of the inspection signal. Movement of the enforcement computer 175 at a high rate of speed may be another trigger condition, such as an intentional shaking of the mobile enforcement computer 175 triggering transmission of the inspection signal. For example, instead of pressing a button on a display of the enforcement computer 175 which is generated by the inspection application 172, the enforcement person 177 shakes the mobile enforcement computer 175 to trigger transmission of the inspection signal. In another example, the inspection signal is broadcasted periodically (e.g., time-based) or at different locations (e.g., location-based), such at each but stop or train stop.

Also, a determination of when to increment the visual object to be displayed for validation to the next visual object in the sequence may be based on received user input, and/or detection of the trigger conditions programmed for the flow. As discussed above, the incrementing to the next visual object in the flow, which is included or otherwise identified in the inspection signal, may be invoked by detecting the programmed trigger condition. By way of example, the programmed trigger conditions for changing of the visual objects automatically may be based on time, location, movement or other factors. For example, a different visual object or a set of different visual objects may be used for different days, hours, or other time periods. Different visual objects may be used for different vehicles, or different vehicle stops or different vehicle routes. In another example, movement of the enforcement person 177 and/or the mobile enforcement computer 175 may be measured to trigger changing the visual objects. For example, after a predetermined number of steps are taken by the enforcement person 177, the visual objects are changed. In another example, changing of the visual objects may be randomized. Also, the visual objects to include in the flow may be selected periodically for routes, stops, durations, times, user profiles, fare types, etc. Also, different visual objects may be selected for different categories of users or fares.

At 1203, the mobile devices 130 within range of the inspection signal receive the inspection signal and enter inspection mode whereby fare buying via the validation and enforcement applications 132 is disabled.

At 1204, each of the mobile devices 130 that received the inspection signal and that are in inspection mode determines whether the user associated with the mobile device is validated for the validation and enforcement area 101. For example, to determine whether the user is validated, the mobile device accesses validation or fare payment information that is stored locally in the mobile device or may request the information from a remote server or any type of remote computer. In an example, the mobile device may store a recent transaction summary for fare payment, and the transaction summary is parsed to determine whether it is valid for the current location and the current time.

At 1205, for each of the mobile devices 130 that determines the user is validated, the mobile device determines the visual object from the flow to display. For example, the validation and enforcement applications 132 of the mobile device determines from information extracted from the received inspection signal, which visual object to display in response to validating the user. The extracted information for determining which visual object to display may include the visual object itself or other information to identify or generate the visual object. For example, the inspection signal includes the visual object, and the mobile device extracts the visual object from the inspection signal. In another example, the inspection signal includes an identifier of a visual object from the flow, and the mobile device uses the identifier to perform a lookup in a library of visual objects, which may be locally stored at the mobile device, to identify and display the mobile device. In another example, a value provided in the inspection signal is input into function at the mobile device, and the output of the function is used to perform the lookup in the library of visual objects. The library of visual objects may be periodically updated, for example, by downloading new libraries or updates to the library from a remote server.

Instead of using a locally stored library of visual objects, in another example, the mobile device sends the function output value to a remote server, and the remote server sends to the mobile device an image associated with the function output value to display.

In another example, the mobile device calculates a unique identifier based on information in the beacon, e.g., the unique identifier may be the function output value. The mobile device sends the unique identifier along with a user credential for the user of the mobile device to the server. The server validates the fare payment information according to the received information and sends back the correct visual object based on profile, location, etc., to the mobile device for display.

In yet another example, an image is stored in the mobile device, and based on the function output value, the mobile device modifies the image and displays the modified image. For example, the stored image may have a blue background. If the output of the function is "undefined" (e.g., meaning the user is not validated), the background color is changed to red. If the output of the function is a different value (e.g., meaning the user is validated), the background color is changed to green. In another example, if the image includes a shape, the shape is changed according to the function output value, or if the image includes text, the text may be changed according to the function output value. The mobile device may include programming or accessing a library that indicates the change to effect on the stored image based on the function output value.

In another example, the function output value may be a byte array that is converted to an image by the validation and enforcement application. For example, the bite array may be pixel locations and dots of a predetermined color and intensity are displayed at each location. In other examples, the bite array may specify vertices of a triangle or a square or another shape, or the bite array may include ASCII values that are converted to text or a string that can be displayed.

At 1206, the mobile device displays the visual object determined at 1205. At 1207, the enforcement computer 175 also displays the visual object. The enforcement person 177 can ask each user that is within a predetermined proximity to the enforcement computer 175, which includes the inspection beacon 176 transmitting the inspection signal, to show their mobile device that should be displaying the same visual object that is displayed on the enforcement computer 175. If the mobile device is displaying the same visual object as the enforcement computer 175, the enforcement individual can quickly determine the user is validated; otherwise the user may not be validated. At 1210, if the user is not validated, the mobile device does not display the visual object from the flow and the enforcement person 177 can quickly see that the mobile device is not displaying the correct visual object to indicate a validated user and then the enforcement person 177 can take the necessary action, such as have the user purchase a ticket, remove the user from the area, give a warning, etc. At 1208, additional information may be displayed if available to help validate the user. As is discussed in further detail below, an image capture device may be used by the enforcement person 177 to capture an image of a user of the mobile device and compare it to stored information to further determine if the user is validated.

The method 1200 is repeated but the enforcement computer 175 increments to the next visual object in the flow to change the visual object for validation, such as in response to detecting the trigger condition (step 1209). For example, the trigger condition programmed for the flow is detected, and the inspection signal is transmitted with information for the next visual object in the flow to be used for visual verification of validation.

Figure 13:
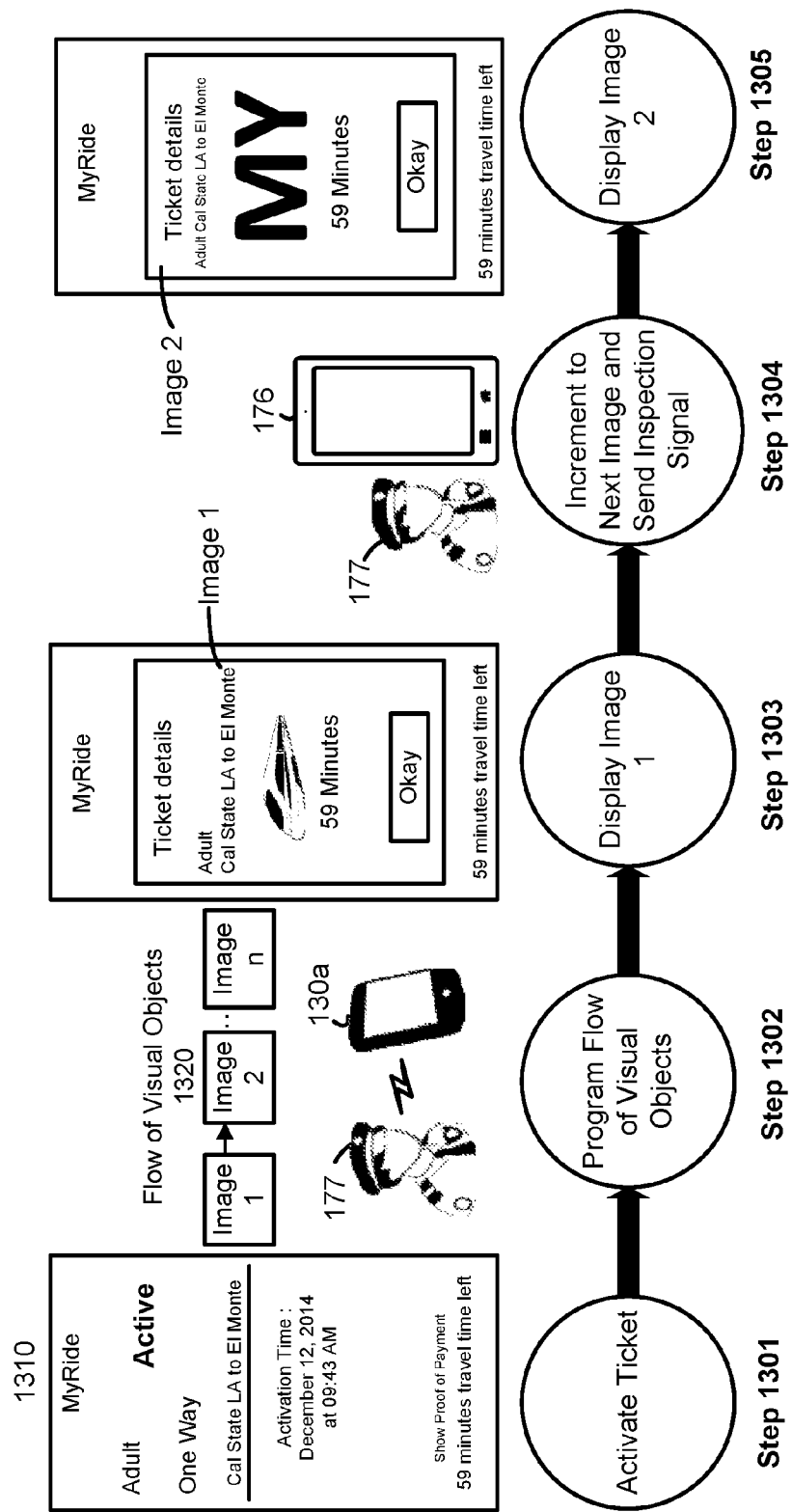
FIG. 13 illustrates an example of visual objects in a flow of visual of objects used for validation.

FIG. 13 includes an example of visual objects in a flow of visual of objects used for validation. At 1301, the passenger, such as the user of one of the mobile devices 130, activates their ticket, shown as 1310, or has a valid pass for the month or another duration. At 1302, the enforcement person 177 programs the flow of visual objects. The flow of visual objects 1320 for example includes images 1-*n*, where n is an integer greater than 1, and other parameters discussed above, and the inspection signal is transmitted from the beacon, including information for image 1, to the mobile device 130*a* which is in the vicinity of the beacon (such as within range). At 1303, the mobile device detects the beacon and displays image 1 if the user is validated. The enforcement computer 175 also displays image 1 to allow for visual verification of the same image being displayed on both devices. At 1304, the trigger condition for the flow of visual objects is detected, and the beacon is configured to transmit an inspection signal for the next visual object in the flow, such as image 2. For example, an increment mechanism, such as a counter, is incremented in response to detecting the trigger condition. The counter may be part of the inspection application 172. Based on determining the value of the counter has been incremented, the inspection application 172 configures the beacon to transmit the inspection signal with information for image 2 because it is the next visual object in the flow 1320. At 1305, a mobile device receives the inspection signal and displays image 2 if the user of the mobile device is validated. The enforcement computer 175 also displays image 2 to allow for visual verification of the same image being displayed on both devices. This process is repeated. When the end of the flow 1320 is reached, the flow 1320 may loop back to image 1 and repeat the images of the flow.

Figure 14:
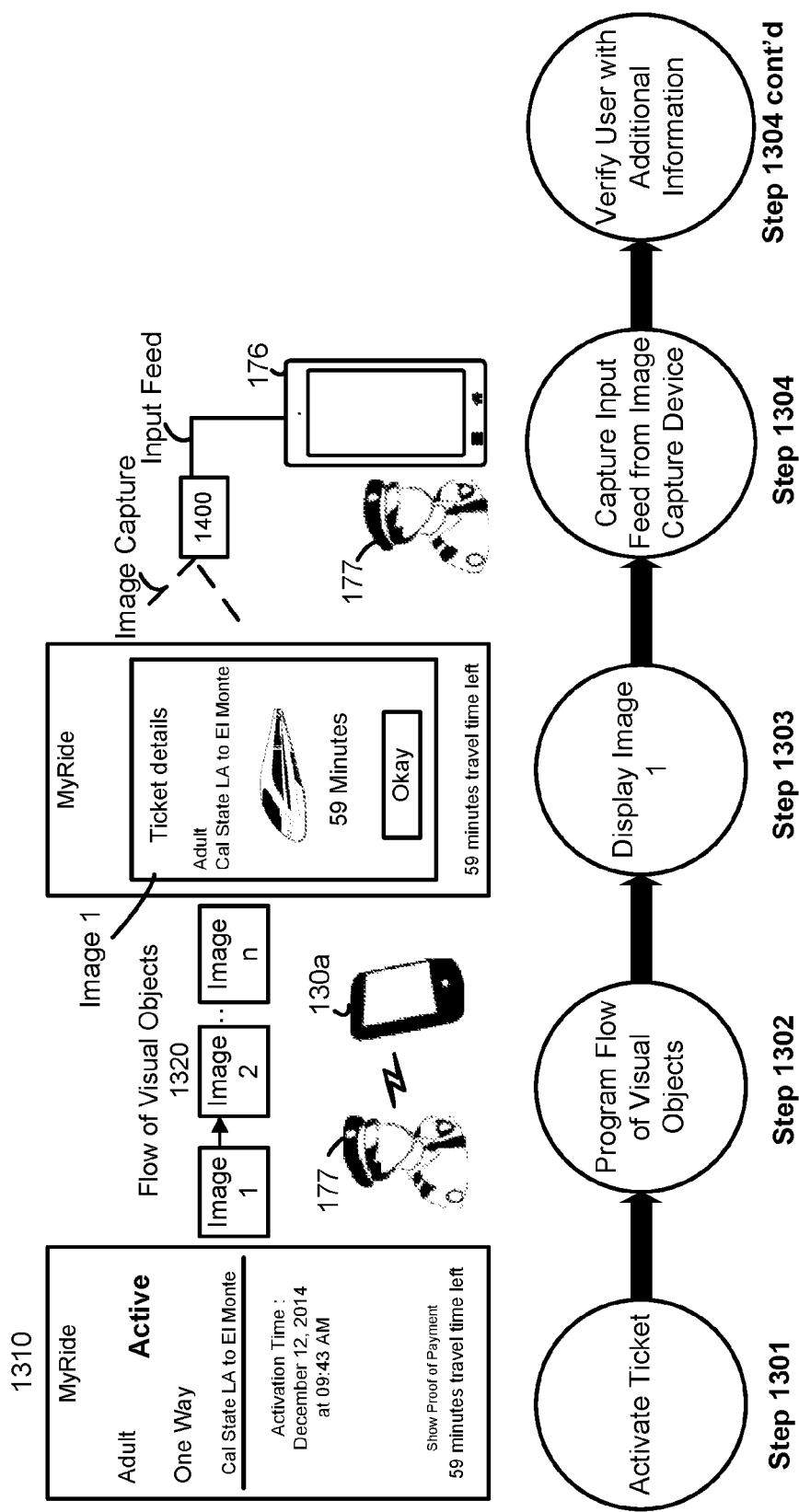
FIG. 14 shows an example of using the flow of visual objects to validate a user.

FIG. 14 shows another example of using the flow of visual objects to validate a user, whereby additional information about the user of the mobile device is captured, for example, via an image capture device 1400. The image capture device 1400 is part of or is connected to the enforcement computer 175, and the enforcement computer 175 receives an input feed from the imaging capture device 1400. The image capture device 1400 may be a camera of a mobile phone or another conventional image capture device that may capture still images or video. In another example, the image capture device 1400 is a smart wearable device, such as GOOGLE glass, etc. From the input feed, the enforcement computer 175 identifies the visual object displayed on the mobile device, such as image 1, and other information, such as the user's face. The enforcement computer 175 may use information from the input feed, such as the captured visual object, equipment data from the enforcement computer 175 (e.g., route, current stop, current geographic location determined from GPS, etc.), and image recognition of the user's face to verify the user. For example, the facial recognition determines whether the user is correctly validated for their class of fare, such as child or senior. The captured visual object may be compared to image 1 to determine whether it is the same. Also, the equipment data may be used to verify whether the user's ticket is valid for the current location or route. Information from the input feed may be sent to a remote computer and/or compared with locally stored information to provide the additional information for verification of validation of the user. Also, the additional information may be displayed on the enforcement computer 175 or on the pair of smart glasses to aid the enforcement person 177 in validating a user. Although not shown, the remaining steps of FIG. 13 may be performed, including incrementing to the next visual object of the flow for transmission of another inspection signal. The additional information may be determined as needed each time the enforcement person 177 is validating a user.

Figure 15:
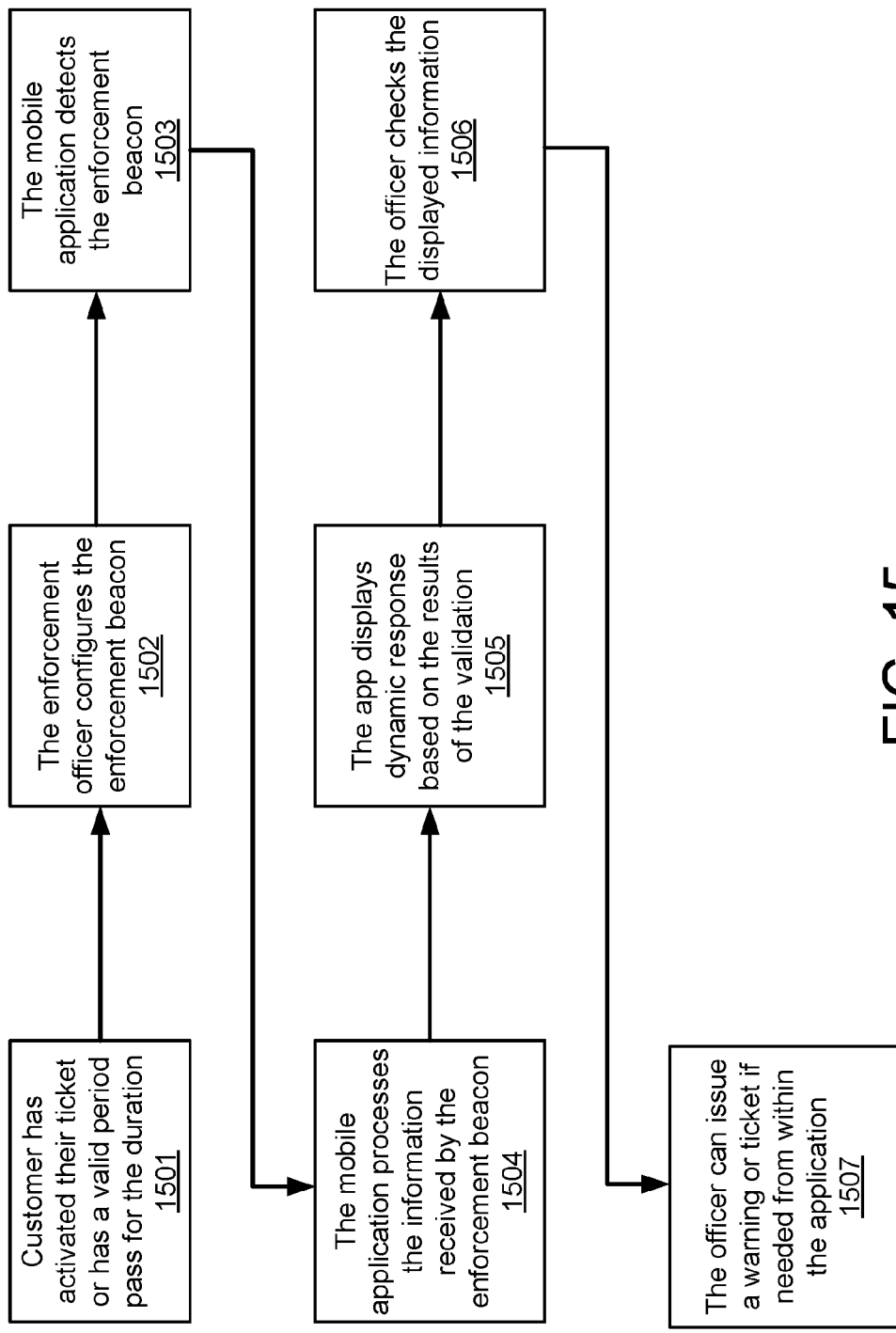
FIG. 15 shows a flow chart of a method for beacon-based enforcement, according to an example of the present disclosure.

FIG. 15 shows a flow chart of a method for beacon-based enforcement, according to an example of the present disclosure. FIG. 15 includes many of the steps of FIG. 12. At 1501, a user activates their ticket or has a valid pass for the current time period or trip. For example, the user 131*a* may purchase a ticket, or may have a monthly pass for the validation and enforcement area 151. At 1502, the inspection beacon 176, which may be part of the enforcement computer 175 or may be a separate device, is configured. The inspection beacon 176 may include a processing circuit performing beacon operations described in this method and below. The processing circuit may include a processor or other hardware capable of performing the operations. Configuring the inspection beacon 176 may be based on input from the enforcement person 177, and may include determining information to include in the inspection signal. The information may identify visual objects to display. An inspection signal is transmitted from the inspection beacon 176 based on the configuring of the inspection beacon 176. At 1503, mobile devices 130 within range of the inspection beacon 176 detect the inspection signal. At 1504, validation and enforcement applications 132 on the mobile devices within range process information in the received inspection signal. At 1505, the validation and enforcement applications 132 display a dynamic response based on information in the inspection signal and based on a determination of whether the users associated with the mobile devices are validated.

For example, the validation and enforcement applications 132 determine from information extracted from the received inspection signal, which visual object to display in response to validating the user. The extracted information for determining which visual object to display may include the visual object itself or other information to identify or generate the visual object. At 1506, the enforcement person 177 can view the information or object displayed on the mobile devices to determine if the users are validated and issue a warning or ticket if needed at 1507.

Figure 16:
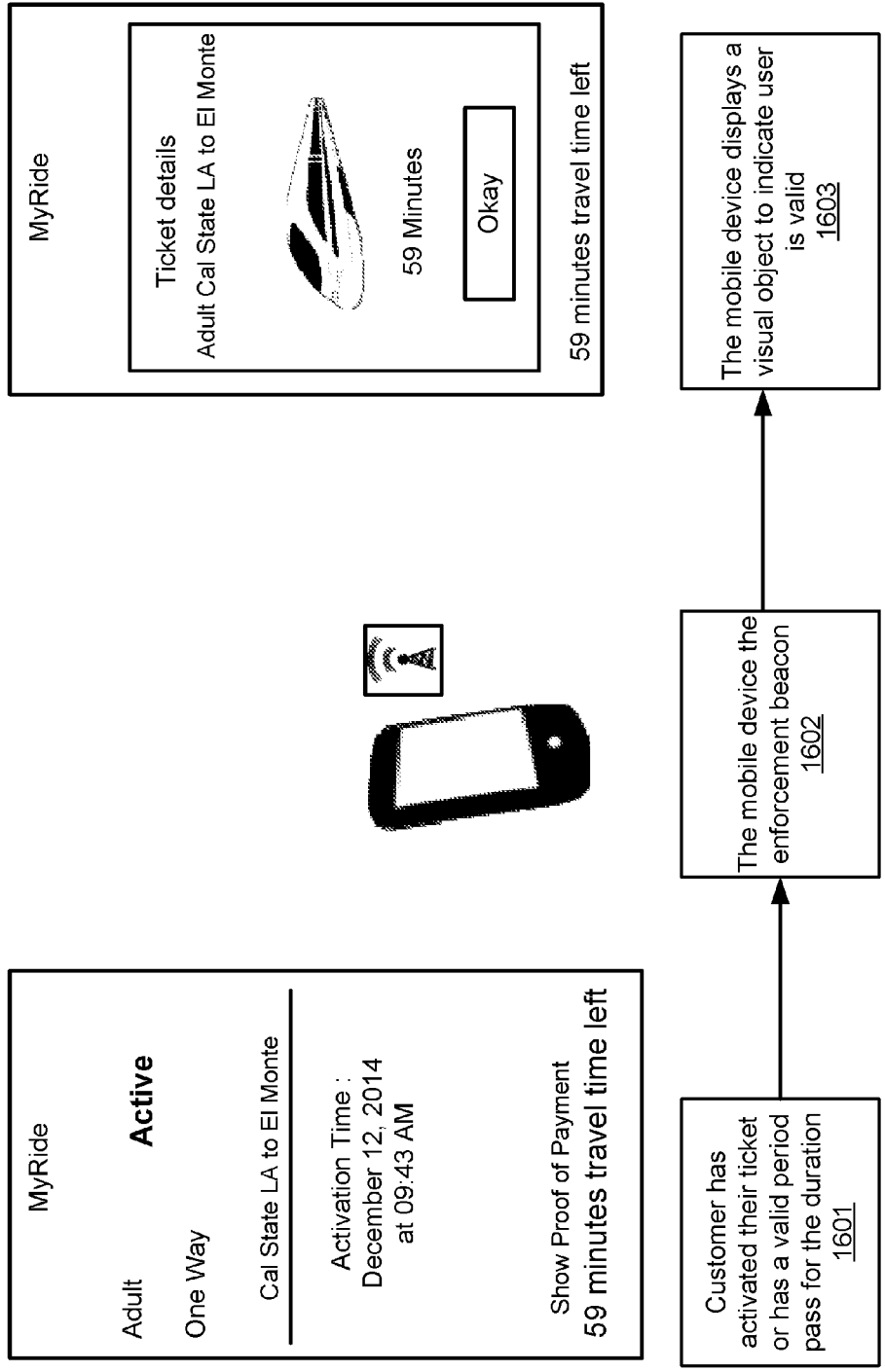
FIGS. 16-17 show pictorial flow diagrams for beacon-based enforcement, according to examples of the present disclosure.
Figure 17:
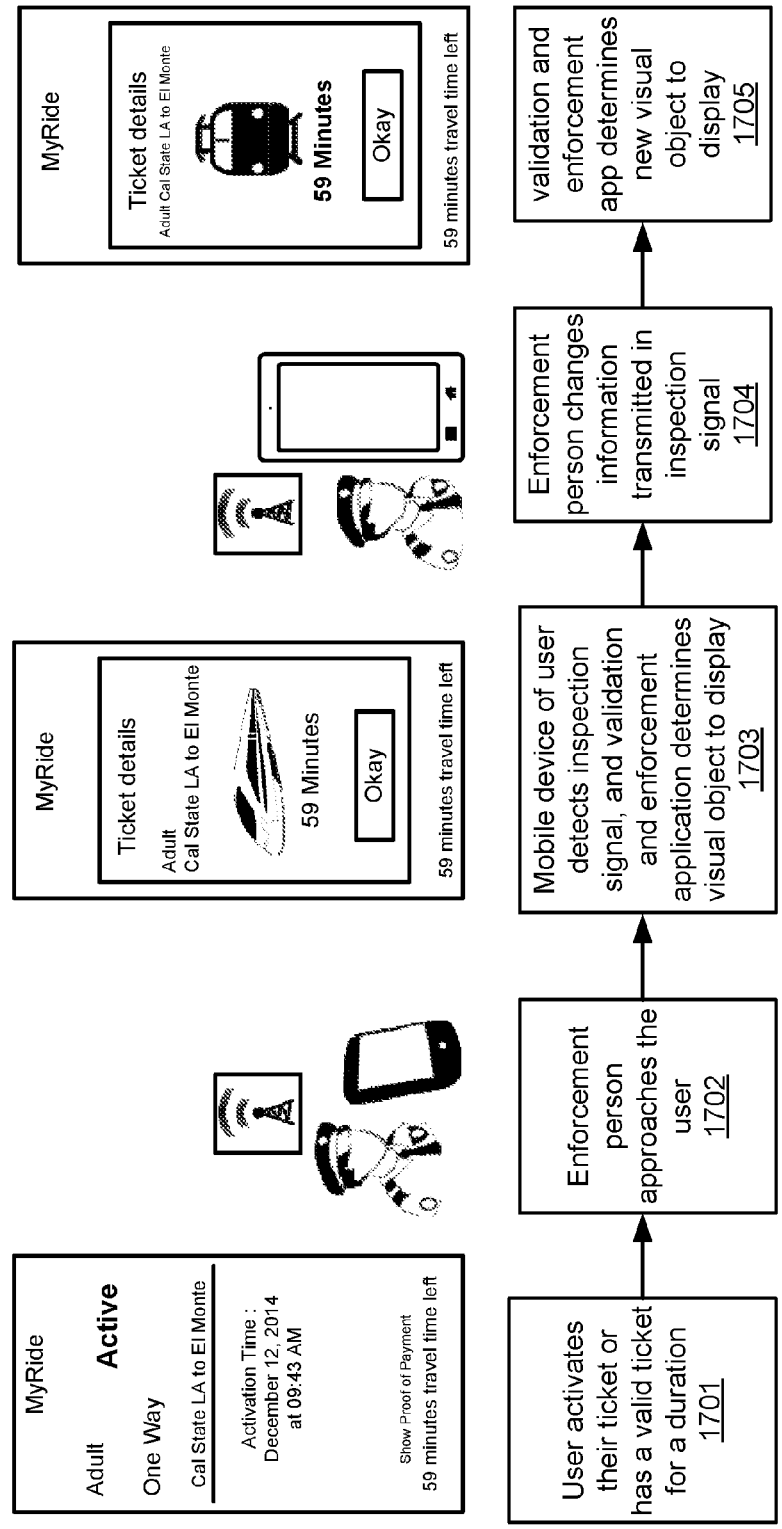

FIGS. 16-17 show pictorial flow diagrams for beacon-based enforcement, according to examples of the present disclosure. The mobile device in the figures may include the mobile device 130a executing the validation and enforcement application 132a and receiving a broadcasted signal from the inspection beacon 176. The flow diagrams include one or more steps from FIG. 15. Referring to FIG. 16, at 1601, the user activates their ticket or has a valid ticket for a duration. The ticket shown at 1601 is for an adult fare that has a duration of one hour. At 1602, the mobile device of the user detects the inspection signal from an enforcement beacon. At 1603, the mobile device displays a visual object to indicate the user is valid. The visual object to display is determined based on ticket validity and information in the inspection signal.

Referring to FIG. 17, at 1701, the user activates their ticket or has a valid ticket for a duration. The ticket shown at 1701 is for an adult fare that has a duration of one hour. At 1702, the enforcement person 177 approaches a user of the ticket shown in 1701. At 1703, the mobile device of the user detects the inspection signal from the beacon, and the validation and enforcement application running on the mobile device dynamically determines the visual object to display based on ticket validity and information in the inspection signal. At 1704, the enforcement person 177 changes the information transmitted in the inspection signal, and at 1705, the validation and enforcement application running on the mobile device dynamically determines a new visual object to display based on ticket validity and information in the inspection signal. For example, the displayed image may change and/or an attribute is changed, such as the background changes color from white to green.

Figure 18:
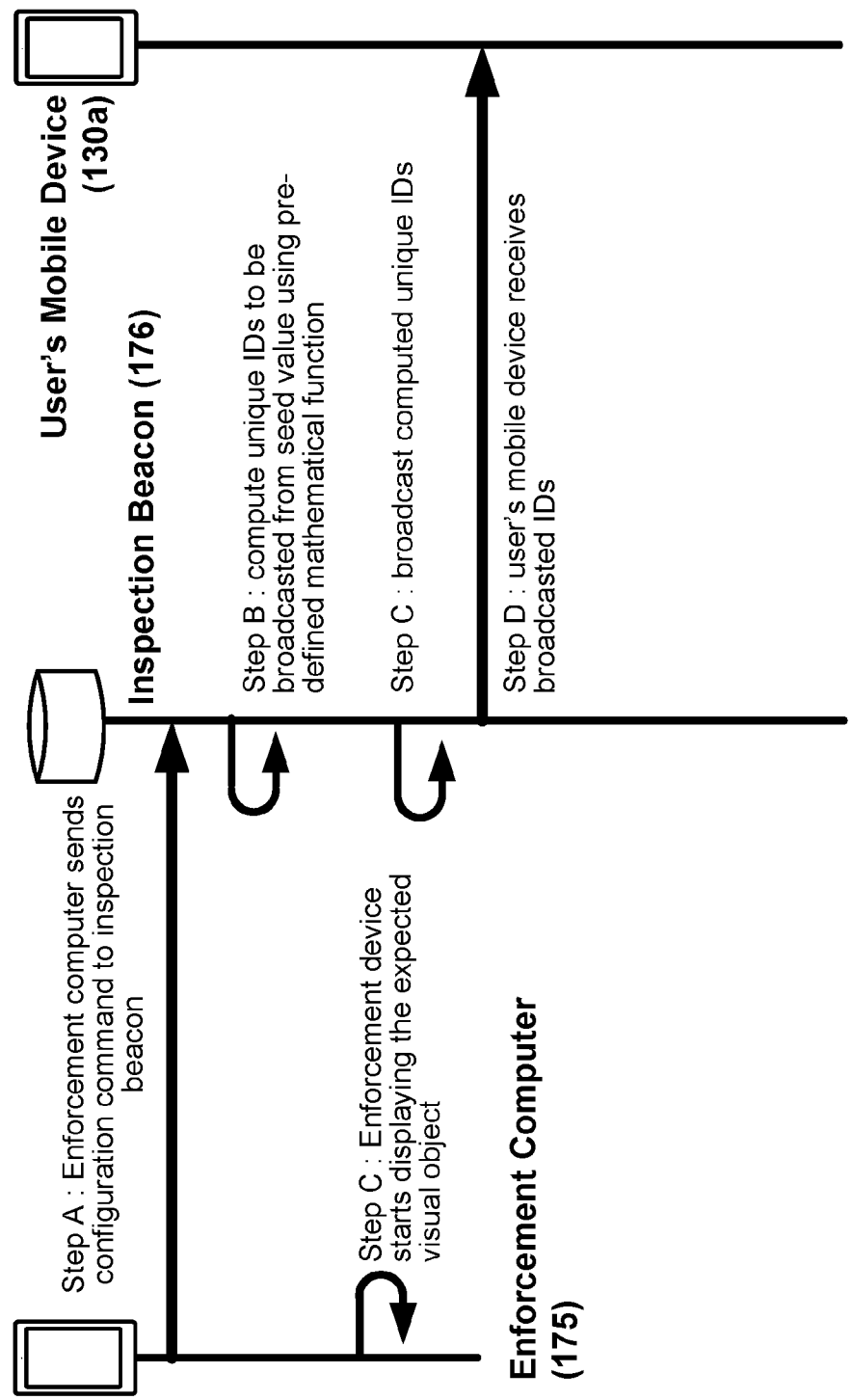
FIGS. 18-20 show examples of operations and communications between the enforcement computer 175, the inspection beacon 176, and a mobile device.
Figure 19:
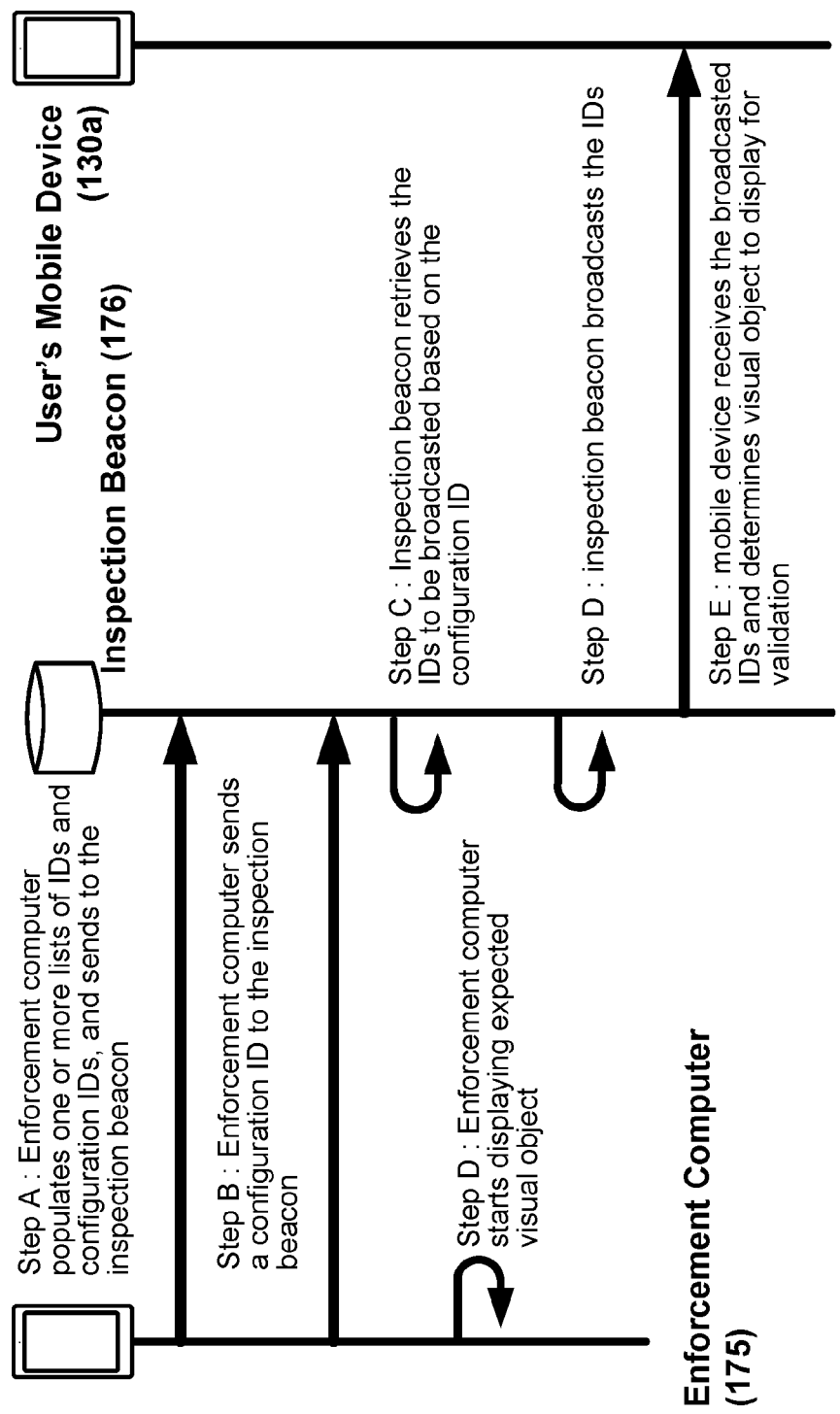
Figure 20:
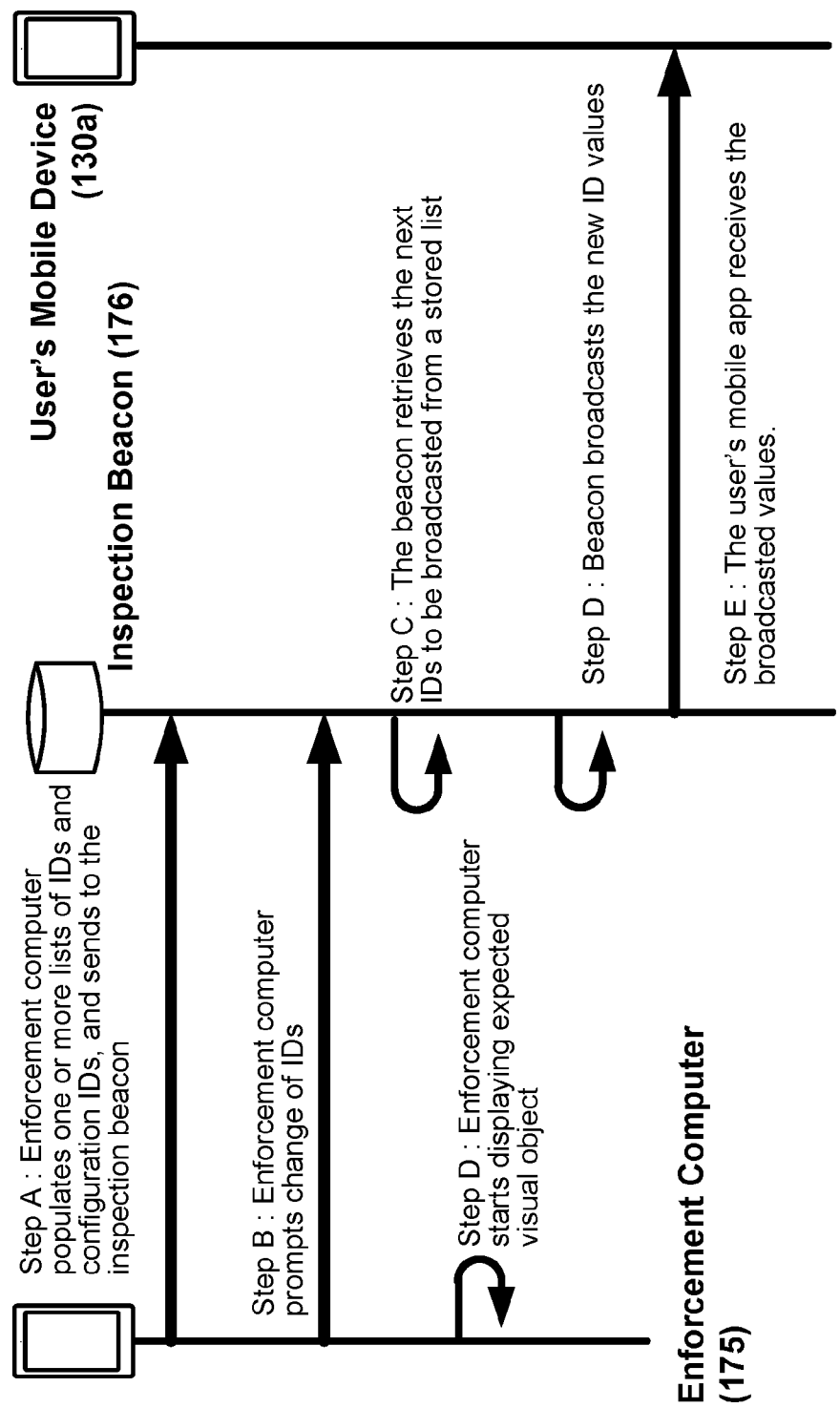

FIGS. 18-20 show examples of operations and communications between the enforcement computer 175, the inspection beacon 176, and a mobile device, such as the mobile device 130a, of the mobile devices 130 executing the validation and enforcement application 132a. In FIGS. 18-20, the inspection beacon 176 may compute unique identifiers (IDs) in multiple ways, and the unique IDs may each identify visual objects. For example, each unique ID may identify a different visual object that represents a validated user. The inspection beacon 176 may broadcast the unique IDs, and the validation and enforcement application 132a and the enforcement computer 175 may store the unique IDs and the visual object associated with each unique ID. Then, the visual object to display to represent a validated user may be determined according to the unique IDs and the methods described herein.

FIG. 18 shows an example whereby the inspection beacon 176 calculates the unique IDs that are associated with different visual objects, for example representing a validated user. In FIG. 18, at step A, the enforcement computer 175 sends a configuration command to the inspection beacon 176. The configuration command may include a seed value for calculating the unique IDs. A seed value is any value that can be used as an input to a mathematical function to calculate an output. At step B, the inspection beacon 176 computes the unique IDs to be broadcasted from the seed value using a pre-defined mathematical function, which may be a formula. One or multiple mathematical functions may be used to calculate the unique IDs. At step C, the inspection beacon 176 broadcasts the computed unique IDs, and at step D, the mobile device 130a receives the broadcasted unique IDs, and the validation and enforcement application 132a stores the unique IDs in a data storage of the mobile device 130a and associates a visual object with each unique ID. The enforcement computer 175 also associates the same visual object with each unique ID and stores this information.

The broadcasted unique IDs are used by the validation and enforcement application 132a to identify the visual object to display for a validated user. For example, at step C, as shown in FIG. 18, the enforcement computer 175 displays the visual object corresponding to one of the unique IDs, and the mobile device 130a may also display the same visual object corresponding to the same unique ID if its user is validated. In an example, the broadcasted unique IDs may be in a specific order representing the flow of visual objects, and the validation and enforcement application 132a determines which visual object to display according to the flow such as described in the method 1200.

FIG. 19 shows an example whereby the inspection beacon 176 determines the IDs to broadcast based on an identified list of IDs. For example, at step A in FIG. 19, the enforcement computer 175 populates one or more lists of IDs for visual objects, and configuration IDs identifying the lists, and sends the lists and the configuration IDs to the inspection beacon 176. At step B, the enforcement computer 175 sends one of the configuration IDs to the inspection beacon 176. At step C, the inspection beacon 176 retrieves the IDs to be broadcasted that corresponds to the received configuration ID. For example, the inspection beacon 176 identifies the IDs to broadcast based on the received configuration ID and the list of IDs corresponding to the received configuration ID, and broadcasts the IDs for the visual objects at step D. Also, at step D, the enforcement computer 175 displays the visual object corresponding to one of the unique IDs, and the mobile device 130a receives the broadcasted IDs for the visual objects and may also display the same visual object displayed on the enforcement computer 175 if its user is validated at step E.

FIG. 20 shows an example whereby the inspection beacon 176 determines the IDs to broadcast based on an identified list of IDs, and the enforcement computer 176 prompts the beacon to change the broadcasted IDs as needed. For example, at step A, the enforcement computer 175 populates one or more lists of IDs for visual objects, and configuration IDs for the lists, and sends the lists and the configuration IDs to the inspection beacon 176. At step B, the enforcement computer 175 prompts change of broadcasted IDs. For example, the enforcement person 177 performs an action, such as pressing a button or moving a certain number of steps or shaking the enforcement computer 175. The action is user input sensed by the enforcement computer 175. In response to detecting the input, a signal is sent to the inspection beacon 176 to change the IDs at step B. At step C, the inspection beacon 176 receives the signal and determines the next list of IDs to broadcast, which may be based on a predetermined order. The inspection beacon 176 broadcasts the IDs for the visual objects at step D. Also, at step D, the enforcement computer 175 displays the visual object corresponding to one of the unique IDs, and the mobile device 130a receives the broadcasted IDs for the visual objects and may also display the same visual object displayed on the enforcement computer 175 if its user is validated at step E.

The lists of IDs can be populated by the enforcement person 177 or through back office operations and sent and stored at the enforcement computer 176. The enforcement computer 176 can store multiple lists of IDs, and the enforcement person 177 can create custom lists.

According to an example, a list of unique IDs can be sent to the inspection beacon 176. A next command is sent to the inspection beacon 176, and the inspection beacon 176 broadcasts the next unique ID from the list and loops through the list when it reaches the end of it. The next command might also trigger the inspection beacon 176 to generate a random number, and pick the unique ID at that number and broadcast that unique ID. The broadcasted ID may identify a particular visual object to display for a validated user.

According to another example, a library is present within the inspection beacon 176, and the enforcement computer 176 sends a credential to the inspection beacon 176. The credential is an input to the library, and the output of the library is the unique identifiers to be broadcasted.

FIGS. 19 and 20 show examples for creating unique IDs, which may be included in the lists of unique IDs broadcasted by the inspection beacon 176, as discussed above. The inspection beacon 176 may have an ID assigned to it during provisioning. A seed is provisioned inside the inspection beacon 176 during provisioning. The seed may be stored inside a secure storage in the inspection beacon 176, like a secure element or a secure isolated processor core. The seed is unique to the inspection beacon 176. The seed may also be securely stored on a server. As shown in FIG. 19, the seed and other shown inputs may be input to one or more predefined algorithms, e.g., mathematical functions, to calculate the unique IDs. The output of one algorithm may be the input to another in a predefined sequence to calculate the unique IDs.

FIG. 20 is similar to FIG. 19, except, unique ID generation is based on location and/or sub-location of the inspection beacon 176 and a vendor specific seed. The inspection beacon 176 may have an ID assigned to it during provisioning. A vendor specific seed is provisioned inside the inspection beacon 176 during provisioning. The vendor specific seed may be assigned by an outside vendor. The vendor specific seed for example is the same for all beacons for a particular business or city or province (i.e., location and/or sub-location within the location). The vendor specific seed may also be securely stored on a server. As shown in FIG. 20, the vendor specific seed and other shown inputs may be input to one or more predefined algorithms to calculate the unique IDs. The output of one algorithm may be the input to another in a predefined sequence to calculate the unique IDs.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. An enforcement computer deployable in a short-distance-based communication and enforcement system for a validation and enforcement area, the enforcement computer comprising:
   a short-distance communication interface;
   a processor to:
   receive user input for programming a flow of visual objects displayable in a sequence specified in the programming of the flow;
   store the programmed flow of visual objects in a data storage of the enforcement computer;
   configure a beacon to transmit an inspection signal via the short-distance communication interface for the validation and enforcement area, wherein the inspection signal includes information to prompt displaying of a visual object from the flow on a mobile device receiving the inspection signal in response to a validation;
   display the visual object on a display of the enforcement computer;
   detect a trigger condition for incrementing to a next visual object in the sequence of the flow;
   configure the beacon to transmit a second inspection signal via the short-distance communication interface for the validation and enforcement area, wherein the second inspection signal includes information to prompt displaying of the next visual object in the sequence on a mobile device receiving the second inspection signal in response to a validation; and
   display the next visual object in the sequence on the display of the enforcement computer.

2. The enforcement computer of claim 1, wherein the trigger condition is associated with at least one of time, location, measured movement of the enforcement computer, user input received via an input/output device of the enforcement computer, and verification of receipt of the inspection signal by the mobile device.

3. The enforcement computer of claim 1, wherein at least one of the inspection signal and the second inspection signal comprises a signal broadcasted from the short-distance communication interface.

4. The enforcement computer of claim 1, wherein the mobile device receiving the inspection signal is to determine whether a user of the mobile device is validated for the validation and enforcement area, and in response to determining the user is validated for the validation and enforcement area, display the visual object on the mobile device.

5. The enforcement computer of claim 1, wherein the input for programming the flow of visual objects comprises at least one of the visual objects and an identifier of the visual objects, and an order of the visual objects in the sequence.

6. The enforcement computer of claim 1, wherein the input for programming the flow of visual objects comprises an indication of the trigger condition to trigger incrementing to the next visual object in the sequence.

7. The enforcement computer of claim 1, wherein the input for programming the flow of visual objects comprises at least one of flow attributes applicable to the entire flow of visual objects, and visual object attributes applicable to one or a subset of the visual objects.

8. The enforcement computer of claim 1, comprising a counter, wherein the processor is to increment the counter for each transmission of an inspection signal from the beacon to advance to a next visual object in the flow.

9. The enforcement computer of claim 1, wherein the inspection signal including information to prompt displaying of a visual object from the flow comprises a first

37 enforcement variable used by the mobile device to determine the visual object and display the visual object or the visual object.

10. A mobile device deployable in a short-distance-based communication and enforcement system for a validation and enforcement area, the mobile device comprising:
at least one short-distance communication interface to receive an inspection signal transmitted from an enforcement computer, wherein the inspection signal includes information for a visual object from a flow of visual objects programmed in the enforcement computer;
a display;
a data storage storing a validation and enforcement application; and
a processor executing the validation and enforcement application to extract the information for the visual object from the inspection signal; determine whether a user associated with the mobile device is validated for the validation and enforcement area; and display the visual object on the display of the mobile device,
wherein the visual object is displayed on a display of the enforcement computer at the same time the visual object displayed on the mobile device if the user associated with the mobile device is determined to be validated for the validation and enforcement area.

11. The mobile device of claim 10, wherein the at least one short-distance communication interface is to receive a second inspection signal transmitted from the enforcement computer, wherein the second inspection signal includes information for a next visual object from the flow of visual objects programmed in the enforcement computer; and
the processor executing the validation and enforcement application is to:
extract the information for the next visual object from the inspection signal; and
display the next visual object on the display of the mobile device if the user associated with the mobile device is validated for the validation and enforcement area.

12. The mobile device of claim 10, wherein the processor is to calculate a function output value based on a function and the information for the visual object extracted from the inspection signal; and determine the visual object to display on the display of the mobile device from the function output value.

13. The mobile device of claim 10, wherein the data storage is to store a library of visual objects and the processor is to identify the visual object from the library based on the information for the visual object extracted from the inspection signal.

14. The mobile device of claim 10, wherein the processor is to determine the visual object to display based on a modification to a stored visual object determined according to the information for the visual object extracted from the inspection signal.

15. An enforcement computer deployable in a short-distance-based communication and enforcement system for a validation and enforcement area, the enforcement computer comprising:
a short-distance communication interface;
a display;
an image capture device; and
a processor to:
receive user input for programming a flow of visual objects displayable in a sequence specified in the programming of the flow;

38 store the programmed flow of visual objects in a data storage of the enforcement computer;
configure a beacon to transmit an inspection signal via the short-distance communication interface for the validation and enforcement area, wherein the inspection signal includes information to prompt displaying of a visual object from the flow on a mobile device receiving the inspection signal in response to a validation of a user of the mobile device for the validation and enforcement area;
display the visual object on a display of the enforcement computer;
receive an input feed from image capture device, wherein the input feed includes at least one image of a display of the mobile device and a user of the mobile device;
determine whether the user of the mobile device is validated for the validation and enforcement area based on the input feed and additional information associated with the validation and enforcement area or the user; and
display results of the validation on the display of the enforcement computer.

16. The enforcement computer of claim 15, wherein the processor is to display the visual object on the display of the enforcement computer during transmitting of the inspecting signal or in response to transmitting the inspection signal, and the results of the validation are displayed with the visual object.

17. The enforcement computer of claim 15, wherein the processor is to:
detect a trigger condition for incrementing to a next visual object in the sequence of the flow; and
configure the beacon to send a second inspection signal via the short-distance communication interface, wherein the second inspection signal includes information to prompt displaying of the next visual object in the sequence on the mobile device if the user is validated; and
display the next visual object in the sequence on the display of the enforcement computer.

18. The enforcement computer of claim 17, wherein the trigger condition is associated with at least one of time, location, measured movement of the enforcement computer, user input received via an input/output device of the enforcement computer, and verification of receipt of the inspection signal by the mobile device.

19. The enforcement computer of claim 17, wherein at least one of the inspection signal and the second inspection signal comprises a signal broadcasted from the short-distance communication interface.

20. The enforcement computer of claim 15, wherein the enforcement computer is associated with a validation and enforcement area, and the mobile device receiving the inspection signal is to determine whether a user of the mobile device is validated for the validation and enforcement area, and in response to determining the user is validated for the validation and enforcement area, display the visual object on the mobile device.

21. An inspection beacon deployable in a short-distance-based communication and enforcement system, the inspection beacon comprising:
a short-distance communication interface; and
a processing circuit to:
determine at least one set of unique identifiers (IDs) of visual objects based on received enforcement information; and broadcast the at least one set of unique IDs via the short-distance communication interface for a validation and enforcement area, wherein a mobile device of a validated user within range of the inspection beacon is to receive the at least one set of unique IDs and determine a visual object to display for the validated user based on a unique ID of the received at least one set of unique IDs, and an enforcement computer is to store the at least one set of unique IDs and determine the same visual object to display on the enforcement computer as the visual object displayed by the mobile device based on the unique ID.

22. The inspection beacon of claim 21, wherein to determine the at least one set of unique IDs, the processing circuit is to receive a seed value from the enforcement computer and determine the at least one set of unique IDs based on one or more mathematical functions and the seed value.

23. The inspection beacon of claim 22, wherein the seed value is stored in at least one of a secure storage and the inspection beacon when the inspection beacon is provisioned.

24. The inspection beacon of claim 22, wherein the seed value is determined based on a location or a sub-location of the location where the inspection beacon is located.

25. The inspection beacon of claim 21, comprising:
a data storage, wherein the at least one set of unique IDs comprises a plurality of sets of unique IDs stored in the data storage, and each set of unique IDs has an ID, wherein to determine the at least one set of unique IDs, the processing circuit is to receive one of the ID of one of the plurality of sets, and broadcast the set of unique IDs corresponding to the received ID.

26. The inspection beacon of claim 25, wherein the processing circuit is to:
receive a signal from the enforcement computer to change the broadcasted set of unique IDs; and
determine a next set of stored unique IDs to broadcast.

27. The inspection beacon of claim 26, wherein the enforcement computer receives or detects user input to change the broadcasted IDs, and transmits the signal to change the broadcasted IDs based on the received or detected user input.

28. The inspection beacon of claim 21, wherein the at least one set of unique IDs is programmed by a user of the enforcement computer.

29. The inspection beacon of claim 21, wherein the processing circuit broadcasts each unique ID via the short distance interface in response to a command received from the enforcement computer.

30. The inspection beacon of claim 21, wherein the processing circuit broadcasts each unique ID via the short distance interface, and the processing circuit randomly selects the unique ID to broadcast.

31. The enforcement computer of claim 1, wherein the inspection signal is to place a validation enforcement application for the mobile device in an inspection mode to disable validation of the mobile device.

* * * * *